(12) United States Patent
Sebastian

(10) Patent No.: US 8,780,823 B1
(45) Date of Patent: Jul. 15, 2014

(54) EVENT DRIVEN GRANT ALLOCATION

(75) Inventor: William B. Sebastian, Quincy, MA (US)

(73) Assignee: ViaSat, Inc., Carlsbad, CA (US)

( * ) Notice: Subject to any disclaimer, the term of this patent is extended or adjusted under 35 U.S.C. 154(b) by 256 days.

(21) Appl. No.: 12/901,250

(22) Filed: Oct. 8, 2010

Related U.S. Application Data

(60) Provisional application No. 61/249,967, filed on Oct. 8, 2009, provisional application No. 61/249,952, filed on Oct. 8, 2009.

(51) Int. Cl.
- *H04W 4/00* (2009.01)
- *H04L 12/26* (2006.01)
- *H04L 1/00* (2006.01)
- *H04J 1/16* (2006.01)
- *G08C 15/00* (2006.01)
- *G06F 11/00* (2006.01)
- *G01R 31/08* (2006.01)

(52) U.S. Cl.
USPC ............................ 370/329; 370/328; 370/248

(58) Field of Classification Search
USPC ........................................................ 370/329
See application file for complete search history.

(56) References Cited

U.S. PATENT DOCUMENTS

| | | | |
|---|---|---|---|
| 6,208,640 B1 | 3/2001 | Spell et al. |
| 6,282,542 B1 | 8/2001 | Carneal et al. |
| 6,463,454 B1 | 10/2002 | Lumelsky et al. |
| 7,116,682 B1 | 10/2006 | Waclawsky et al. |
| 7,769,863 B2 | 8/2010 | Eidenschink |
| 8,359,387 B2 | 1/2013 | Eidenschink |
| 2001/0011300 A1 | 8/2001 | Pitts |
| 2001/0043617 A1 | 11/2001 | McKinnon et al. |
| 2001/0048670 A1 | 12/2001 | Kelly et al. |
| 2001/0053152 A1 | 12/2001 | Sala et al. |
| 2003/0027522 A1 | 2/2003 | Valdivia et al. |
| 2003/0031141 A1 | 2/2003 | Schweinhart et al. |
| 2003/0081626 A1 | 5/2003 | Naor et al. |
| 2003/0123394 A1 | 7/2003 | Neale et al. |

(Continued)

FOREIGN PATENT DOCUMENTS

WO 2006/055944 A2 5/2006

OTHER PUBLICATIONS

Extended European Search Report of Mar. 1, 2012 for European Patent Application No. EP05825156; 10 pages.

(Continued)

*Primary Examiner* — Noel Beharry
(74) *Attorney, Agent, or Firm* — Kilpatrick Townsend & Stockton LLP

(57) ABSTRACT

Systems and methods are described for event-driven predictive scheduling of a return link of a communications system. Embodiments detect an event (e.g., a packet) on a forward link that may indicate future usage of the return link. The event is then associated with an event model that characterizes the event, and the event model is further associated with a predictive model. Scheduling of the return link is implemented and/or adjusted according to the predictive model. For example, return link allocations are adjusted by one or more amounts (e.g., one or more grants are allocated or bandwidth is adjusted by a certain amount) and at one or more designated timing offsets according to the predictive model. According to various embodiments, the predictive model is generated by tracking feedback from the return link and/or by scanning packets on the forward link.

20 Claims, 15 Drawing Sheets

(56) References Cited

U.S. PATENT DOCUMENTS

| | | |
|---|---|---|
| 2003/0212787 A1 | 11/2003 | Qiu et al. |
| 2005/0026621 A1 | 2/2005 | Febvre et al. |
| 2005/0163059 A1 | 7/2005 | Dacosta et al. |
| 2005/0254426 A1 | 11/2005 | Simonis |
| 2006/0020700 A1 | 1/2006 | Qiu et al. |
| 2006/0034167 A1 | 2/2006 | Grice et al. |
| 2006/0109788 A1 | 5/2006 | Eidenschink |
| 2006/0120282 A1 | 6/2006 | Carlson et al. |
| 2007/0252724 A1 | 11/2007 | Donaghey et al. |
| 2008/0016248 A1* | 1/2008 | Tsirtsis et al. ............... 709/248 |
| 2008/0037428 A1 | 2/2008 | Nation et al. |
| 2008/0037464 A1* | 2/2008 | Lim et al. .................... 370/329 |
| 2010/0311433 A1* | 12/2010 | Lindskog et al. ............ 455/450 |

OTHER PUBLICATIONS

Final Office Action of Jul. 16, 2009 for U.S. Appl. No. 11/282,359, 17 pages.

International Preliminary Report on Patentability of May 22, 2007 and Written Opinion for PCT Patent Application No. PCT/US2005/42244, 4 pages.

International Search Report of Nov. 29, 2006 for PCT Patent Application No. PCT/US2005/42244, 3 pages.

Non-Final Office Action of Jan. 9, 2009 for U.S. Appl. No. 11/282,359, 17 pages.

Non-Final Office Action of Jul. 26, 2012 for U.S. Appl. No. 12/830,188, 9 pages.

Notice of Allowance of Mar. 24, 2010 for U.S. Appl. No. 11/282,359, 17 pages.

Notice of Allowance of Sep. 19, 2012 for U.S. Appl. No. 12/830,188, 6 pages.

U.S. Appl. No. 61/231,267, filed Aug. 4, 2009.
U.S. Appl. No. 61/247,489, filed Sep. 30, 2009.
U.S. Appl. No. 61/249,952, filed Oct. 8, 2009.
U.S. Appl. No. 61/249,967, filed Oct. 8, 2009.

* cited by examiner

EVENT DRIVEN GRANT ALLOCATION

CROSS-REFERENCES TO RELATED APPLICATIONS

This application claims the benefit of and is a non-provisional of U.S. Provisional Application Ser. No. 61/249,952, filed on Oct. 8, 2009, titled "METHODS AND SYSTEMS FOR IMPLEMENTING EVENT DRIVEN GRANT ALLOCATION"; and U.S. Provisional Application Ser. No. 61/249,967, filed on Oct. 8, 2009, titled "PREDICTIVE REQUESTS UTILIZING PREFETCHING TECHNIQUES", both of which are hereby expressly incorporated by reference in their entireties for all purposes.

BACKGROUND

In many typical communications system architectures, the return link has limited bandwidth and operates according to upload bandwidth allowances from a protocol partner. For example, in a typical satellite network configuration, bandwidth may be allocated to a client-side system by a server-side system as "grants" (e.g., blocks of bandwidth). Efficient use of the return-link resources may, therefore, be optimized by allocating a precise amount of the resources precisely when they are needed for an upload.

Of various conventional schemes that exist for return-link allocations, most fall in one of two categories. According to a first category, feedback is received over the return link to indicate that previous allocations were either larger or smaller than needed, and the allocations are adjusted accordingly. According to a second category, explicit requests are received from the user terminals, and allocations are issued in response to those requests.

While both categories of conventional approach provide certain features, the efficacy of those approaches can be appreciably limited by a high-latency return link. For example, a user terminal may have to wait for an explicit request to be sent over the return link and for an allocation response to be received before being able to upload data corresponding to the request. Accordingly, it may be desirable to provide techniques for predicting magnitudes and timing of return-link allocation requests, so that an optimal amount of resources is available on the return link when needed for each upload.

SUMMARY

Among other things, methods, systems, devices, and software are provided for event-driven predictive scheduling of a return link of a communications system. Embodiments detect an event on a forward link of the communications system that may indicate future usage of the return link. For example, the event may be a packet of data traversing the forward link. The event is then associated with an event model that characterizes the event, and the event model is further associated with a predictive model. Scheduling of the return link is implemented and/or adjusted according to the predictive model. For example, return link allocations are adjusted by one or more amounts (e.g., one or more grants are allocated or bandwidth is adjusted by a certain amount) and at one or more designated timing offsets according to the predictive model. In some embodiments, the predictive model is generated by tracking feedback (e.g., link status, statistics, etc.) from the return link to dynamically adjust magnitudes and timing of return link allocations. In other embodiments, the predictive model is additionally or alternatively generated by scanning (e.g., parsing) packets on the forward link for metadata that can be applied to the predictive model.

In one set of embodiments, a method is provided. The method includes: detecting, at a provider side of a communications system, an event predictor corresponding to a download packet destined for a user terminal over a forward link of the communications system, the event predictor indicating a future event to occur in association with receipt of the download packet at the user terminal; selecting a prediction model according to the detected event predictor from a number of prediction models maintained at the provider side of the communications system; generating a resource allocation according to the selected prediction model at the provider side of the communications system, the resource allocation indicating a magnitude by which to adjust resources of a return link of the communications system associated with the user terminal, and the resource allocation indicating a timing offset at which to adjust the resources by the magnitude, the timing offset corresponding to an amount of time after occurrence of the event; scheduling the resources of the return link of the communications system associated with the user terminal at least according to the resource allocation; and communicating data corresponding to the data packet and data corresponding to the resource allocation to the user terminal over the forward link of the communications system.

In another set of embodiments, a base station system is provided. The base station is disposed in a satellite communications network, is in communication with a user terminal over a satellite link having a forward link and a return link, and comprises an optimizer subsystem, a predictive grant generator subsystem, and a satellite modem termination subsystem. The optimizer subsystem is configured to detect an event predictor corresponding to a download packet destined for the user terminal over the forward link, the event predictor indicating a future event to occur in association with receipt of the download packet at the user terminal. The predictive grant generator subsystem is communicatively coupled with the optimizer subsystem and is configured to select a prediction model according to the detected event predictor, and generate a resource allocation according to the selected prediction model, the resource allocation indicating a magnitude by which to adjust resources of the return link and a timing offset at which to adjust the resources by the magnitude, the timing offset corresponding to an amount of time after occurrence of the event. The satellite modem termination subsystem is communicatively coupled with the predictive grant generator subsystem, and the optimizer subsystem and is configured to: schedule the resources of the return link at least according to the resource allocation; and communicate data corresponding to the download packet and data corresponding to the resource allocation to the user terminal over the forward link.

In yet another set of embodiments, a satellite communications system is provided that includes a base station in communication with a user terminal over a satellite link having a forward link and a return link. The base station is configured to: detect an event predictor corresponding to a download packet destined for the user terminal over the forward link, the event predictor indicating a future event to occur in association with receipt of the download packet at the user terminal; select a prediction model according to the detected event predictor; generate a resource allocation according to the selected prediction model, the resource allocation indicating a magnitude by which to adjust resources of the return link and a timing offset at which to adjust the resources by the magnitude, the timing offset corresponding to an amount of time after occurrence of the event; schedule the resources of the return link at least according to the resource allocation; and communicate data corresponding to the download packet and data corresponding to the resource allocation to the user terminal over the forward link. In some embodiments, the satellite communications system further includes the user terminal, which is configured to: receive the data corresponding to the download packet and the data corresponding to the resource allocation from the base station over the forward link; receive an upload packet from an application in communication with the user terminal at least partially in response to receiving the data corresponding to the download packet; and upload the upload packet to the base station via the return link according to the resource allocation.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
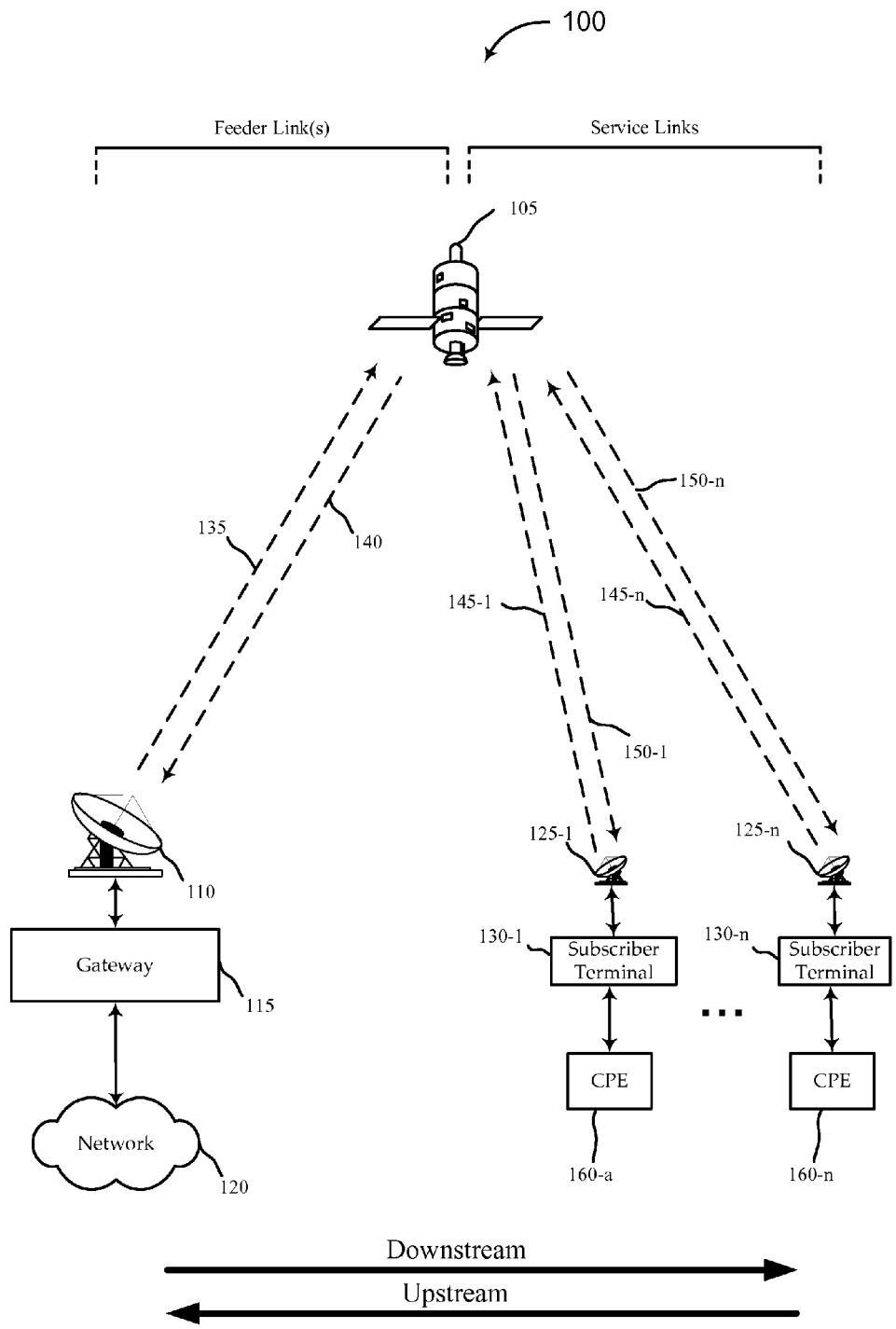
FIG. 1 shows a simplified block diagram of a communications system for use with various embodiments.

In the appended figures, similar components and/or features may have the same reference label. Further, various components of the same type may be distinguished by following the reference label by a second label that distinguishes among the similar components. If only the first reference label is used in the specification, except where otherwise noted, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

Embodiments relate to predicting the timing and size of uploads from a subscriber terminal, so that optimum amounts of return-link bandwidth are available at optimal times for uploads. For example, appropriately sized grant requests (e.g., or bandwidth adjustments) are issued when needed and are not issued for intervals when no data needs to be uploaded. Optimizing magnitudes and timing of return-link allocations can be difficult, particularly when the arrival of packets at the user terminal for uploading is unevenly distributed over time. Further, as discussed above, many conventional techniques for using feedback and/or explicit grant requests can be frustrated by the presence of a high-latency return link (e.g., a satellite link).

Many network applications, such as HTTP or CIFS, use a client-server architecture, in which client applications upload requests and the server issues responses. In these cases, the issuance of a request by the client application is often correlated to the receipt of a response to a previous request. The time at which response packets will arrive at the user terminal is known in advance at the base station from which the response packets are being emitted. Hence, a model can predict the number, size, and timing of blocks that will arrive at the user terminal for uploading following each such event. This upload arrival model can then be used to schedule return link grants in advance for this predicted traffic.

Accordingly, embodiments implement predictive allocation using an event-driven scheduler and according to various models, including the type of upload arrival model described above. The predictive event-driven scheduler may predict how much data will be uploaded from the subscriber terminal, and it may also predict when each block will be received for uploading and how large each block will be. Notably, it may be difficult or impossible to precisely predict timing and sizes of requests to upload blocks, and errors can be costly. If a grant is provided too early, bandwidth may be wasted, and the block may have to wait for a grant response cycle to be serviced. If a grant is too small, the remainder may also require a grant response cycle, and the data may not be useful to the recipient until the full block is received. Thus, the scheduler may have to balance risks of being too early or too small against inefficiencies of waiting too long or granting unneeded bandwidth.

As described more fully below, embodiments use tracking and/or scanning techniques to implement predictive, event-driven scheduling of the return link. These techniques can yield efficient return-link resource allocation even in the context of a high-latency return link. For example, the techniques may provide options for trading off performance against responsiveness, potentially allowing a satellite network to deliver higher performance while using less bandwidth on the return link.

Referring first to FIG. 1, a module diagram is shown of a satellite communications system 100 for use with various embodiments of the invention. The satellite communications system 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems, or subscriber terminals 130-1-130-n. As noted above, although the communications system 100 is illustrated as a geostationary satellite 105 based communication system, it should be noted that various embodiments described herein are not limited to use in geostationary satellite-based systems; for example, some embodiments could be low earth orbit ("LEO") satellite-based systems or aerial payloads not in orbit and held aloft by planes, blimps, weather balloons, etc. Other embodiments could have a number of satellites instead of just one.

The network 120 may be any type of network and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network supporting data communication between devices described herein, in different embodiments. A network 120 may include both wired and wireless connections, including optical links. As illustrated in a number of embodiments, the network 120 may connect the gateway 115 with other gateways (not shown), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals 130) directed to a destination in the network 120, and can process the received signals for transmission along the network 120.

A device (not shown) connected to the network 120 may communicate with one or more subscriber terminals 130. Data and information, for example IP datagrams, may be sent from a device in the network 120 to the gateway 115. It will be appreciated that the network 120 may be in further communication with a number of different types of providers, including content providers, application providers, service providers, etc. Further, in various embodiments, the providers may communicate content with the satellite communications system 100 through the network 120, or through other components of the system (e.g., directly through the gateway 115).

The gateway 115 may format frames in accordance with a physical layer definition for transmission to the satellite 105. A variety of physical layer transmission modulation and coding techniques may be used with certain embodiments of the invention, including those defined with the DVB-S2 standard. The link 135 from the gateway 115 to the satellite 105 may be referred to hereinafter as the downstream uplink 135. The gateway 115 uses the antenna 110 to transmit the content (e.g., via signals) to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multibeam mode, transmitting a number of narrow beams, each directed at a different region of the earth, allowing for frequency re-use with a multicolor beam pattern.

With such a multibeam satellite 105, there may be any number of different signal switching configurations on the satellite 105, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. There could be a single carrier signal for each service spot beam or multiple carriers in different embodiments. Similarly, single or multiple carrier signals could be used for the feeder spot beams. A variety of physical layer transmission modulation and coding techniques may be used by the satellite 105 in accordance with certain embodiments of the invention, including those defined with the DVB-S2 standard. For other embodiments, a number of configurations are possible (e.g., using LEO satellites, or using a mesh network instead of a star network), as will be evident to those skilled in the art.

The service signals transmitted from the satellite 105 may be received by one or more subscriber terminals 130, via the respective subscriber antenna 125. In one embodiment, the subscriber antenna 125 and terminal 130 together comprise a very small aperture terminal ("VSAT"), with the antenna 125 measuring approximately 0.6 meters in diameter and having approximately 2 watts of power. In other embodiments, a variety of other types of subscriber antennae 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single subscriber terminal 130 or, alternatively, comprise a hub or router (not pictured) that is coupled to multiple subscriber terminals 130-1-130-n.

In some embodiments, some or all of the subscriber terminals 130 are connected to consumer premises equipment ("CPE") 160. CPE may include, for example, computers, local area networks, Internet appliances, wireless networks, etc. A subscriber terminal 130, for example 130-a, may transmit data and information to a network 120 destination via the satellite 105. The subscriber terminal 130 transmits the signals via the upstream uplink 145-1 to the satellite 105 using the subscriber antenna 125-1. The link from the satellite 105 to the gateway 115 may be referred to hereinafter as the upstream downlink 140.

In various embodiments, one or more of the satellite links (e.g., 135, 140, 145, and/or 150) are capable of communicating using one or more communication schemes. In various embodiments, the communication schemes may be the same or different for different links. The communication schemes may include different types of coding and modulation schemes. For example, various satellite links may communicate using physical layer transmission modulation and coding techniques, adaptive coding and modulation schemes, etc. The communication schemes may also use one or more different types of multiplexing schemes, including Multi-Frequency Time-Division Multiple Access ("MF-TDMA"), Time Division Multiple Access ("TDMA"), Frequency Division Multiple Access ("FDMA"), Orthogonal Frequency Division Multiple Access ("OFDMA"), Code Division Multiple Access ("CDMA"), or any number of hybrid or other schemes known in the art.

In a given satellite spot beam, all customers serviced by the spot beam may be capable of receiving all the content traversing the spot beam by virtue of the fact that the satellite communications system 100 employs wireless communications via various antennae (e.g., 110 and 125). However, some of the content may not be intended for receipt by certain customers. As such, the satellite communications system 100 may use various techniques to "direct" content to a subscriber or group of subscribers. For example, the content may be tagged (e.g., using packet header information according to a transmission protocol) with a certain destination identifier (e.g., an IP address) or use different modcode points. Each subscriber terminal 130 may then be adapted to handle the received data according to the tags. For example, content destined for a particular subscriber terminal 130 may be passed on to its respective CPE 160, while content not destined for the subscriber terminal 130 may be ignored. In some cases, the subscriber terminal 130 caches information not destined for the associated CPE 160 for use if the information is later found to be useful in avoiding traffic over the satellite link.

The gateway 115 and subscriber terminals 130 are in a network relationship, such that the gateway 115 can allocate certain resources to the subscriber terminals 130. For example, return-link usage by the subscriber terminals 130 is controlled by a scheduler at the gateway 115, which issues grants to the subscriber terminals 130. Each grant allows the subscriber terminal 130 to upload a specified amount of data at a scheduled time. The total available bandwidth available for uploads by subscriber terminals 130 on the return link is limited, and the grants facilitate effective and efficient usage of that return-link bandwidth. Accordingly, allocation of those return-link resources may be optimized by issuing grants of a proper size at a proper time.

It will be appreciated that, while much of the description herein is presented in the context of satellite communications systems, like the satellite communications system 100 of FIG. 1, similar techniques can be used in other types of communications systems. For example, FIGS. 4 and 8 below discuss illustrative functionality of subscriber terminals, and FIGS. 5-7 and 9-11 discuss illustrative functionality of gateways. The "gateways" and "subscriber terminals" are intended broadly to include any similar type of network partner relationship, including, for example, a client-server relationship, a peer-to-peer relationship, etc. Similarly, discussions of "grants" being issued by the "gateway" to various "subscriber terminals" should be construed broadly to include any type of return link resource allocation being issued by a network relationship partner for another relationship partner.

Figure 2A:
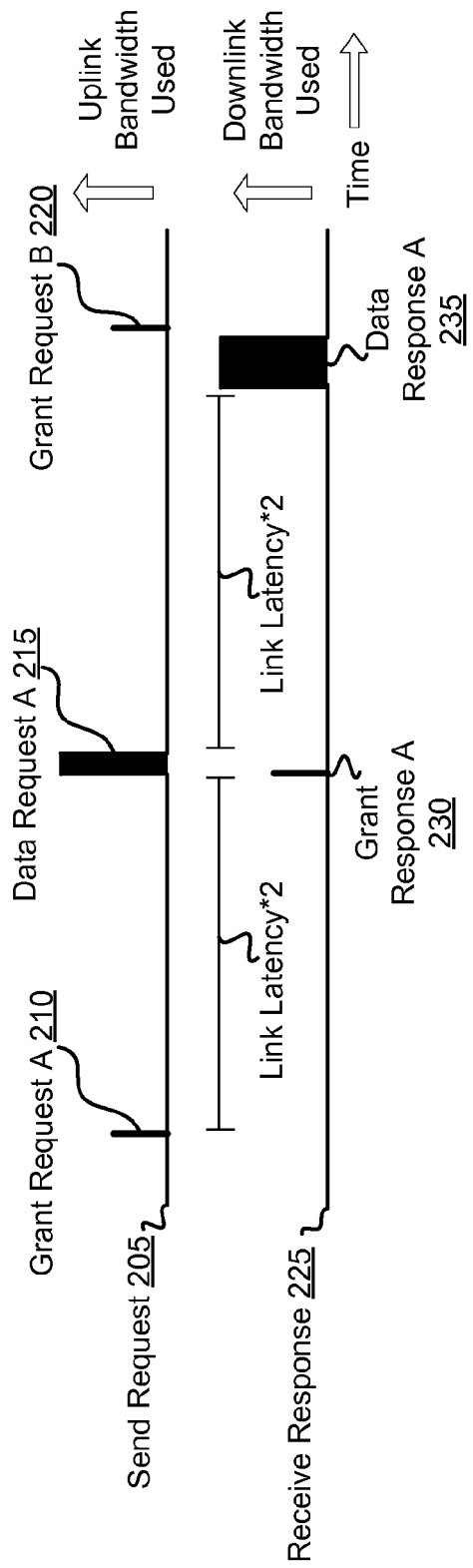
FIG. 2A illustrates a conventional process for implementing scheduling based on individual grant requests in which a subscriber terminal issues a request for each grant that it uses.
Figure 2B:
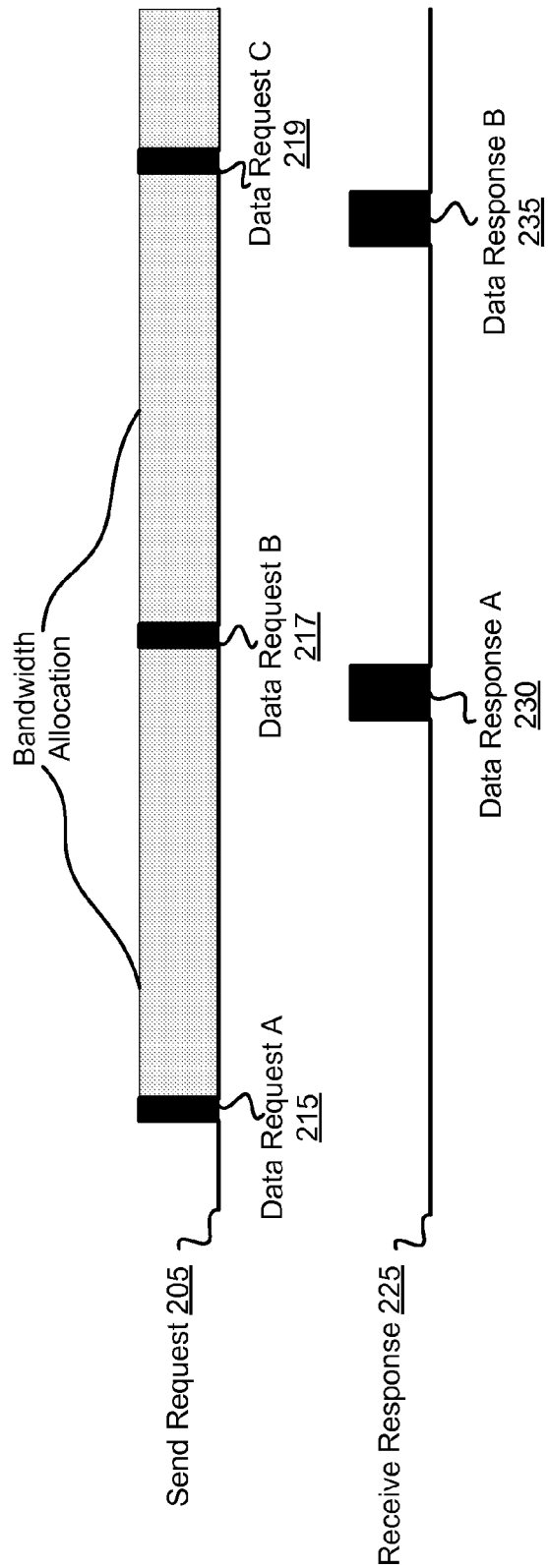
FIG. 2B illustrates another conventional technique for grant allocation in which a subscriber terminal is granted a maximum available upload bandwidth for each grant.
Figure 2C:
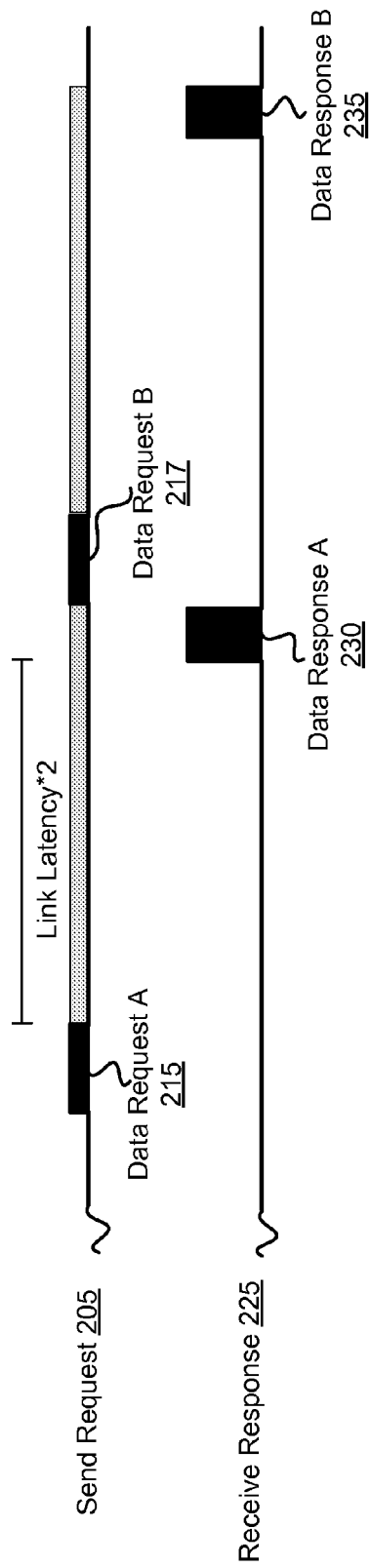
FIG. 2C shows a modification to the technique of FIG. 2B, in which the amount of bandwidth available to the subscriber terminal is fixed, but at a reduced level.

As discussed above, it may be desirable to allocate return-link resources by issuing grants of a proper size at a proper time. FIGS. 2A-2C show various techniques for optimizing grant allocations. FIG. 2A illustrates a conventional process for implementing scheduling based on individual grant requests in which a subscriber terminal issues a request for each grant that it uses. As discussed above, the subscriber terminal may be part of a satellite communications system (e.g., the subscriber terminal 130 of satellite communications system 100 of FIG. 1) and may be configured to receive reverse-link grant allocations from a gateway.

The conventional technique illustrated by FIG. 2A uses explicit requests by the subscriber terminal for grants of a particular size at a particular time. The gateway can then issue grants according to explicit requests, which may result in an efficient allocation of return-link resources. As illustrated, an application located on the subscriber terminal-side of the network downloads a large object from a server on the gateway-side of the satellite link in a series of request/response pairs. FIG. 2A shows illustrative traffic on the satellite network with simplified timings as would be measured from the user side of the terminal.

The illustrated embodiment begins when the subscriber terminal receives a block of data making up a first request. The subscriber terminal may then send request data (illustrated by Send Request 205). In particular, the subscriber terminal requests a grant ("Grant Request A" 210), which is uploaded to a scheduler located at a gateway. The scheduler responds by issuing a grant to the subscriber terminal that will allow the subscriber terminal to upload the number of bytes in the request block. After some time (e.g., due to latency of the link between the subscriber terminal and the gateway in both directions), the subscriber terminal receives the response ("Grant Response A" 230) and then uploads the request ("Data Request A" 215) onto the network.

Due to limited bandwidth on the network, it may take some length of time to transfer this block, which is illustrated by the width of the block shown by Data Request A 215. Typically, the total area of the block relates to the number of bytes in the request. For example, the number of bytes in the block will take some amount of time to send at a particular bandwidth, such that: Number of Bytes=Bandwidth*Time.

In embodiments like the one shown in FIG. 2A, the grant may be issued in response to a particular request, such that an optimal number of blocks is allocated for the grant at an optimal time for the upload. Accordingly, the upload may occur at a maximum supported return-link bandwidth. The transfer time of the data block may, thus, be dominated by the latency of the link. For example, in a satellite network context, the time to traverse the satellite link in both the forward- and return-link directions can be substantial.

Upon receipt of the data (illustrated by Receive Response 225), the gateway 115 receives Data Request A 215, forwards it across the network, receives a response from an application server, and downloads the response to the subscriber terminal. After some time, the subscriber terminal receives the response ("Data Response A" 235), and sends the response to the requesting application. Subsequently, the subscriber terminal receives a next request, for which the subscriber terminal issues another grant request ("Grant Request B" 220). This may initiate another cycle.

For the sake of added clarity, a total time to transfer each block using the technique illustrated in FIG. 2A can be considered as the sum of the twelve main components itemized in Table 1.

TABLE 1

Sources of delay in block transfer using grant requests

| | |
|---|---|
| 1.1 | time before grant request is sent, which depends on the method used to post grant requests |
| 1.2 | network latency for the grant request to reach the base station |
| 1.3 | time for scheduler at base station to process and respond to request |
| 1.4 | network latency for the grant response to reach the user terminal |
| 1.5 | delay until the scheduled time of the grant |
| 1.6 | amount of time needed to transfer the reques block at the available bandwidth |
| 1.7 | network latency for the data request to reach the base station |
| 1.8 | time for the base station to receive the response from the application server |
| 1.9 | time before download of response is scheduled |
| 1.1 | amount of time needed to transfer the response block at the available bandwidth |
| 1.11 | network latency for the data response to reach the user terminal |
| 1.12 | delay before the application receives the response block and issues the next request |

As discussed above, the technique of FIG. 2A uses return-link bandwidth efficiently by issuing grants in response to explicit requests from the subscriber terminal. Notably, however, each cycle involves two round trips: a first round trip for the grant request and response; and a second round trip for the data request and response. Accordingly, this conventional technique may lead to poor performance for many applications, particularly in the context of a high-latency link (e.g., in a satellite network).

FIG. 2B illustrates another conventional technique for grant allocation in which a subscriber terminal is granted a maximum available upload bandwidth for each grant. This may, for example, illustrate a fastest possible completion of a transfer. In the illustrated embodiments, the subscriber terminal is granted the right to use all available upload bandwidth.

The illustrative scenario begins when the subscriber terminal receives a data block containing a request. For example, the subscriber terminal receives a request for data from an application. The request is uploaded (e.g., as a Send Request 205) onto the link as "Data Request A" 215. After some delay, a data response is received (Receive Response 225) from the gateway as "Data Response A" 230. The cycle is shown as repeating for "Data Request B" 217 and "Data Response B" 235. Another cycle is shown beginning with "Data Request C" 219.

As in FIG. 2A, various sources may be responsible for delays. However, unlike with the technique of FIG. 2A, the technique of FIG. 2B avoids delays associated with the grant request and response by simply allocating a maximum possible upload bandwidth at all times to the subscriber terminal. For example, referring to Table 1 above, the technique of FIG. 2B may experience the delays indicated by Items 1.6 through 1.12, while avoiding delays indicated by Items 1.1 through 1.5. As discussed above with reference to FIG. 2A, the time to transfer the data block (e.g., per Item 1.6 of Table 1) may be determined by the size of the request block divided by the available bandwidth, as illustrated by the widths of Data Request A 215, Data Request B 217, and Data Request C 219.

Notably, the data requests (e.g., Data Request A 215) may only use a portion of the available upload bandwidth. In a network with only a single subscriber terminal, the unused upload bandwidth may not be an issue. However, networks with multiple subscriber terminals may be configured so that the subscriber terminals share upload bandwidth. Accordingly, bandwidth that is not used by one subscriber terminal may be used by another subscriber terminal. Thus, while allocating maximum bandwidth to the subscriber terminal may reduce transfer times, it may also represent a highly inefficient use of resources when multiple subscriber terminals are sharing those resources.

While it may be impractical to allocate a maximum amount of bandwidth to more than one subscriber terminal, allocating less than a maximum amount may reduce the effectiveness of an approach, like the one illustrated in FIG. 2B. For example, FIG. 2C shows a modification to the technique of FIG. 2B, in which the amount of bandwidth available to the subscriber terminal is fixed, but at a reduced level. The decrease in bandwidth granted is shown by the reduced height of the transfers shown at "Data Request A" 215 and "Data Request B" 217. To send the same number of bytes as in FIG. 2B, the transfer time (e.g., according to Item 1.6 of Table 1) is increased, as illustrated by the increase in the width of the blocks as compared to the corresponding blocks of FIG. 2B.

Notably, this strategy can be reasonably effective in some cases. For example, as illustrated in FIG. 2C, a reduction in the upload bandwidth does not have an apparent impact on an overall completion time for the request/response sequence. However, certain limitations are present. One such limitation is that, as in FIG. 2B, large blocks of wasted bandwidth (the blocks between Data Request A 215 and Data Request B 217) still remain, thereby potentially reducing performance of the network. Further, if the bandwidth allocation is reduced by too large an extent, there may be insufficient bandwidth available for an upload, which may cause further delays and/or sub-optimal results.

According to certain modifications to the approach of FIG. 2C, techniques adjust the bandwidth provisioning according to feedback from the subscriber terminal. For example, if all the available bandwidth in a grant is not used, the amount of bandwidth granted to that subscriber terminal might be reduced in a subsequent grant. As discussed above, particularly in the context of high-latency links, a feedback approach may be inefficient. For example, even if a scheduler in the gateway receives feedback once per request cycle, the scheduler may only be able to allocate a fixed amount of bandwidth to the subscriber terminal during the full cycle (i.e., the total time that the request/response events are occurring). As such, the feedback approach may not effectively support scenarios where bandwidth needs are changing over shorter intervals.

It will be appreciated from the discussion of FIGS. 2A-2C that it may be difficult to optimally allocate return-link bandwidth. In particular, bandwidth requirements of subscriber-side applications may not be constant over time. Rather, both the timing and size of each upload may differ, and optimal scheduling of grants may have to account for these differences. As discussed with reference to FIG. 2A, this can be accomplished by issuing grants in response to explicit requests from each subscriber terminal, but such a technique may involve undesirable delays in the context of high-latency links.

Accordingly, embodiments schedule grants by anticipating changing allocation needs of its associated subscriber terminals and their associated applications. For example, a scheduler at a gateway anticipates when uplink grants will be used by an application and how much bandwidth should be allocated. In this way, bandwidth is made available substantially "on demand" (i.e., when it is needed without substantial delay), while avoiding granting bandwidth during intervals when it is not needed.

According to some embodiments, events are detected in the forward link. For example, the events may represent certain packets being downloaded, certain download trends, etc. Models are used to generate a prediction according to the detected events. The predictions include a predicted timing offset and a predicted return-link allocation associated with the event. For example, when a certain type of packet is detected on the forward link, a corresponding prediction indicates that one or more grants of particular sizes will be needed (e.g., or reverse-link bandwidth will need to be adjusted by a certain amount) at one or more particular time offsets. These predictive event-driven grant allocations may be implemented by a predictive grant generator, as described below. Notably, embodiments may be used as a supplement to other scheduling mechanisms, such as grant requests sent from the subscriber terminal 130 modem to a return link scheduler.

Figure 3:
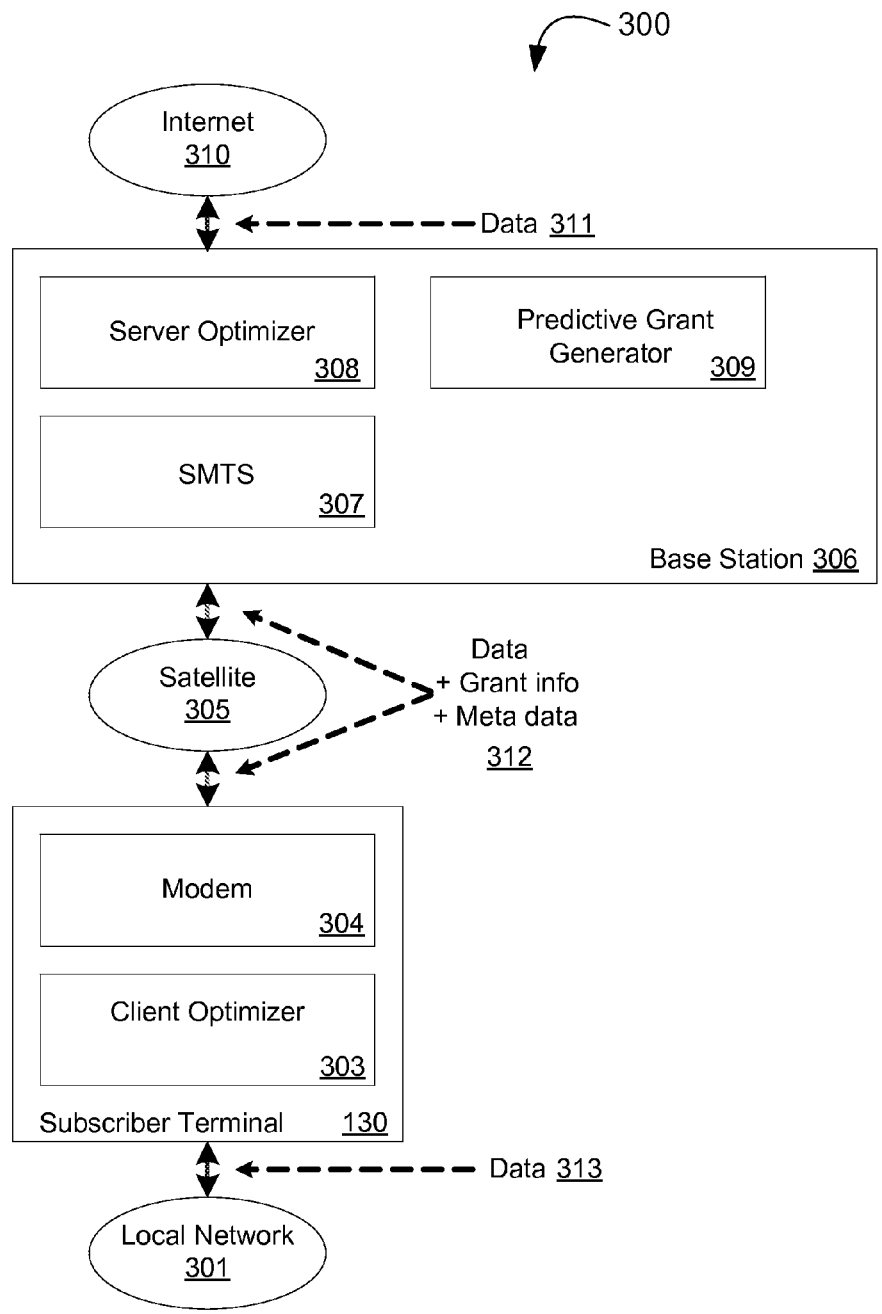
FIG. 3 shows a simplified illustration of a communications system that includes a predictive grant generator for use with various embodiments.

FIG. 3 shows a simplified illustration of a communications system 300 that includes a predictive grant generator for use with various embodiments. A local network 301 is connected to the Internet 310 via a satellite network 305. Embodiments of the invention can support any network types at 301 and/or 310. For example, Internet 310 might be an enterprise network rather than the public Internet, and local network 301 might be a single user machine. In one embodiment, the connection across satellite network 305 is high-latency network. Alternatively, if the network latency at satellite network 305 is low, the grant-request approach of FIG. 2A may be efficient, such as may be done for local area networks (LANs).

The data exchanged to/from the external networks at 311 and 313 may include packets with payloads and headers appropriate for the network types of local network 301 and Internet 310. The data 312 exchanged across the satellite link 305 may be similar to that of packets transported on satellite networks. The data may be optimized in various ways such as data compression or prefetching to reduce bandwidth requirements or improve performance. The data 312 also includes link management information, such as grant requests and responses. In addition to these traffic elements, the present invention may add statistics and status information to the data 312 so as to improve the prediction capabilities.

The subscriber terminal 130 may include a modem 304 and a client optimizer 303, which work in tandem with the predictive grant generator 309 at base station 306. As used herein, "layers" refer to a standard OSI model. According to typical embodiments, the client optimizer 303 operates at layers 4-7, or in certain embodiments, at layers 3-7. For example, the client optimizer 303 may perform data compression/decompression, optimization of transport layer functionality, optimization of application layer functionality, etc. The client optimizer 303 can be embedded in the subscriber terminal 130, or some of the functionality could be performed on an external device or on software on client machines. The client optimizer 303 is useful to the present invention because it has access to information such as URLs and transport status that assists in predicting the grants. While statistics data may typically be received from the optimizers, certain implementations may include a self-contained module for collecting statistics for the predictive grant generator 309.

Three modules at the satellite base station 306 are involved in the predictive grant generation. The server optimizer 308 provides similar functionality as the counterpart client optimizer 303 on the subscriber terminal 130. For example, embodiments of the client optimizer 303 and the server optimizer 308 are implemented as a proxy client and a proxy server, respectively. The server optimizer 308 may be deployed on separate boxes, such as in a server farm, or integrated into the Satellite Modem Termination System (SMTS) 307. The SMTS 307 may be a typical location for scheduling functionality, but in some implementations, scheduling for the return link may be performed by the predictive grant generator 309.

The predictive grant generator 309 is organized at the session level, where session refers to traffic from a single subscriber terminal 130. In one implementation, the function is integrated into the same machine as the server optimizer 308 in order to facilitate communication between these modules, but it could be combined with the SMTS 307 or implemented separately. The predictive grant generator 309 obtains statistics and state information from the server optimizer 308 and uses this to issue grant requests for each session to the SMTS 307.

The SMTS 307 receives these requests from the predictive grant generator 309 and allocates the available return-link bandwidth so as to use available network resources efficiently and fairly among multiple subscriber terminals 130. The fairness scheme for the network may include quality of service (QoS) or Fair Access Plan (FAP) requirements that treat different sessions and types of connections differently. Support for QoS and FAP may require the grant requests received from the predictive grant generator 309 to provide information about the streams for which the grants are being requested. The SMTS 307 may also enforce the precise timing relationships required between the delivery of blocks on the forward link with the provisioning of grants for the return link.

Figure 4:
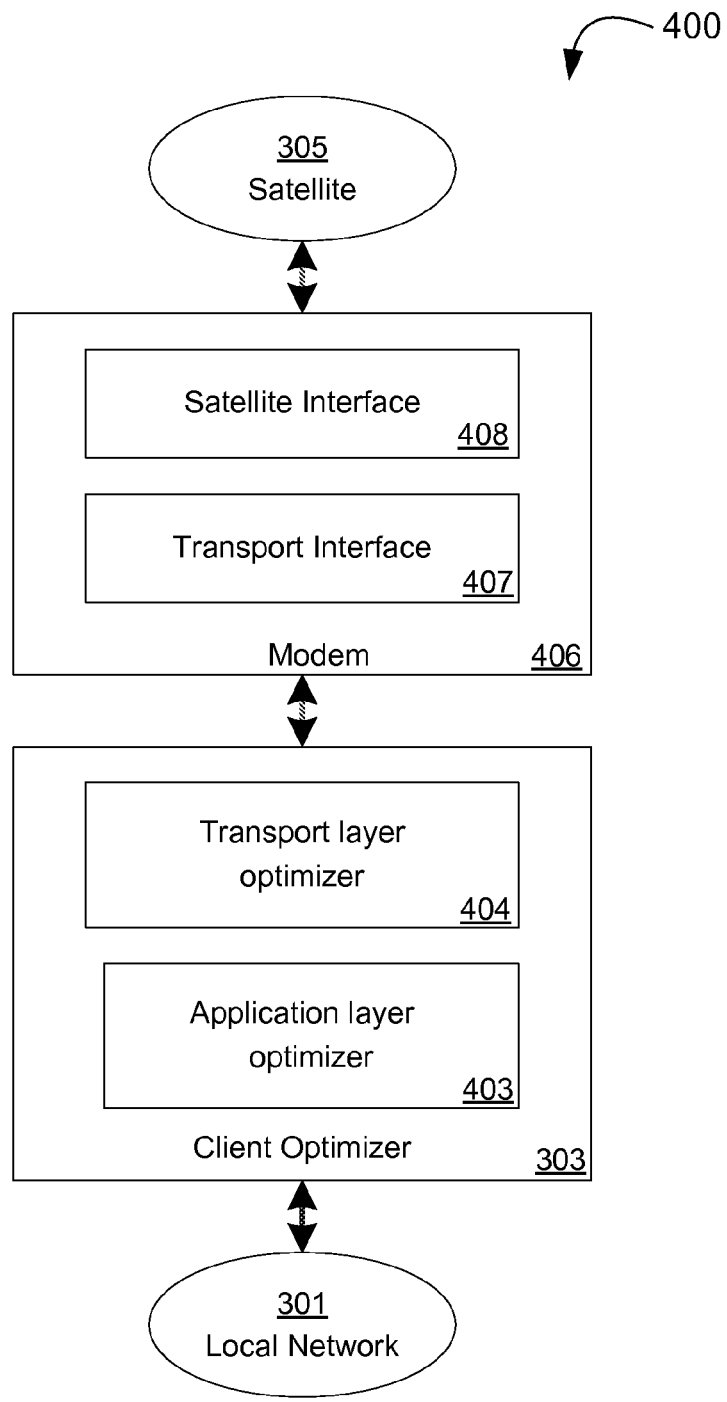
FIG. 4 provides additional details regarding the modules within the subscriber terminal, according to various embodiments.

FIG. 4 shows a simplified block diagram 400 of illustrative modules within the subscriber terminal 130, according to various embodiments. The client optimizer 303 may be divided into a transport layer optimizer 404 and an application layer optimizer 403. In one embodiment, the application layer optimizer 403 may not need to be modified to support event-driven predictive grant techniques. The same application-layer data may be available in the partner optimizer (e.g., the server optimizer in the base station 306) and may be more efficiently collected there. The transport layer optimizer 404 collects the status information and statistics and is used to upload this data via the return link.

Two types of information are provided by the transport interface (407). The first is state information that may be immediately useful to a return-link scheduler (e.g., of a gateway). In one embodiment, the transport layer tracks the amount of data in the output queue(s) of the transport. This represents data that is waiting to be uploaded, but has not yet been sent to the modem 406.

The second type of data collected is statistics about the relationship between the arrival of responses downloaded on the forward link and the subsequent receipt of blocks to be uploaded on the return link. The event modeler at the base station 306 needs to know when downloaded (e.g., forward-link) packets for each URL or application connection arrive at the subscriber terminal 130. It also needs to know the sizes and time of arrival at the subscriber terminal 130 of each block to be uploaded.

Some embodiments use one or more techniques to prevent the upload of this data from consuming too much bandwidth on the return link. One such technique is packet referencing. The subscriber terminal 130 can reference arrival times using identifiers for the downloaded packets, rather than having to supply information about the content of the packets. The arrival times can be specified by adding a few bits to the packet acknowledgements. The base station 306 modules track the contents of each downloaded packet so that the models based on URLs, application servers, and other high-level constructions can be appropriately updated. Another such technique is selective enabling. The modules in the base station 306 can set a flag in the transport header which can enable/disable the collection of statistics, so that the traffic can be suppressed when bandwidth is scarce, when the servers are loaded, or when an adequate model about a high-level construction is already available. Still another such technique is data compression. Several data compression techniques, such as differential timings and logarithmic scaling, can reduce the number of bits transferred.

In one embodiment, the transport layer optimizer 404 is also used to upload the state information and statistics. Integrating the statistics into the other data used for transport management, such as packet acknowledgements, provides an efficient way to transfer the data. This may be particularly true when an extensible proprietary transport is being used, which may often be the case for satellite networks.

The modem 406 receives grants from a gateway-side scheduler (e.g., return-link scheduler 504 of FIG. 5, below), fills them with data waiting in its input queues, and requests grants if none are available for the data. The satellite interface 408 can request grants whenever it has data waiting to be sent, and the scheduler can then reconcile these requests with the grants that are already being issued via the predictive grant requests (as described in more detail below).

Figure 5:
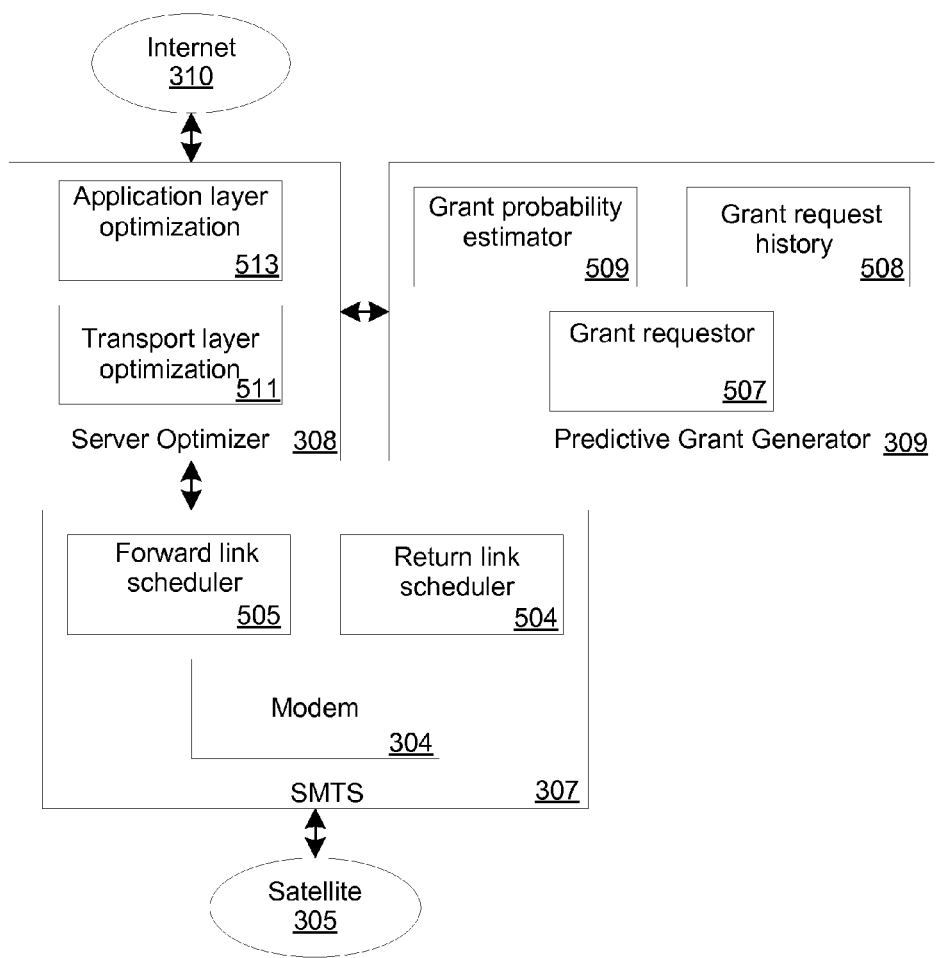
FIG. 5 provides an overview of the modules at the base station, according to various embodiments.

FIG. 5 provides simplified block diagram 500 of modules of an illustrative base station 306, according to various embodiments. The predictive event-driven grants are requested by the predictive grant generator 309 using statistical and state data provided by the server optimizer 308 and submitted to a return-link scheduler 504 within the SMTS 307. Like its counterpart on the client side, the server optimizer 308 provides state information and statistics that are used to predict the grant requirements. In one embodiment, it is also used to convey the grant requests from the predictive grant generator 309 to the SMTS 307 by attaching the requests to the compressed packets. For example, as illustrated, the predictive grant generator 309 includes a grant probability estimator 509 and grant request histories 508 to make predictive grant allocation requests. A grant requestor 507 may then request grants, accordingly.

A partial listing of some of the types of data that is collected is provided in Table 2. The description of the predictive grant generator 309 will show how these items can be used to estimate the requirements for grants on the return link. While the data could be obtained by a stand-alone module, some embodiments integrate with an existing optimizer, using a status and statistics collector (not shown) to store the data and make it available to the predictive grant generator 309. For the sake of added clarity, the data items in the table will be referred to herein as "metadata," in contrast to the normal packet data containing the compressed data that is transferred across the satellite link (data 312).

TABLE 2

Examples of Data Collected at the Application Layer

| | | |
|---|---|---|
| 2.1 | End-of-File | Whether all the data in a file has been sent |
| 2.2 | File Size | A size obtained using application-layer data, such as from HTTP headers or FTP control data |
| 2.3 | TCP Connection Status | Opening and/or closing of application TCP connections, which may not be readily visible to the optimizer |
| 2.4 | Application Server | Information about the application server involved in a transfer, such as a URL (for HTTP), or host server IP addresses and ports |
| 2.5 | Embedded Objects | Information in HTML, XML, and/or other files that reference embedded objects in HTTP |

Various embodiments use this type of data to predict grant requirements for various types of events. One type of event is uploads that are correlated to downloads. These uploads across the return link typically occur just after the receipt of downloads from the forward link. In this case, information about the data being downloaded, such as Items 2.4 and 2.5, can be used to predict the size and timing of the next grants needed, along with state information, such as Items 2.1, 2.2, and 2.3. Another type of event is large uploads. One example is a file transfer, where the goal is to predict how much more data will be uploaded, and the useful information includes state information from the client as well as Items 2.1, 2.2, and 2.3. Still another type of event includes user-generated and/or user-triggered events. These are for requests that are not synchronized to the timing of responses and are the least predictable element. Items 2.3 and 2.4 can be useful.

Figure 6:
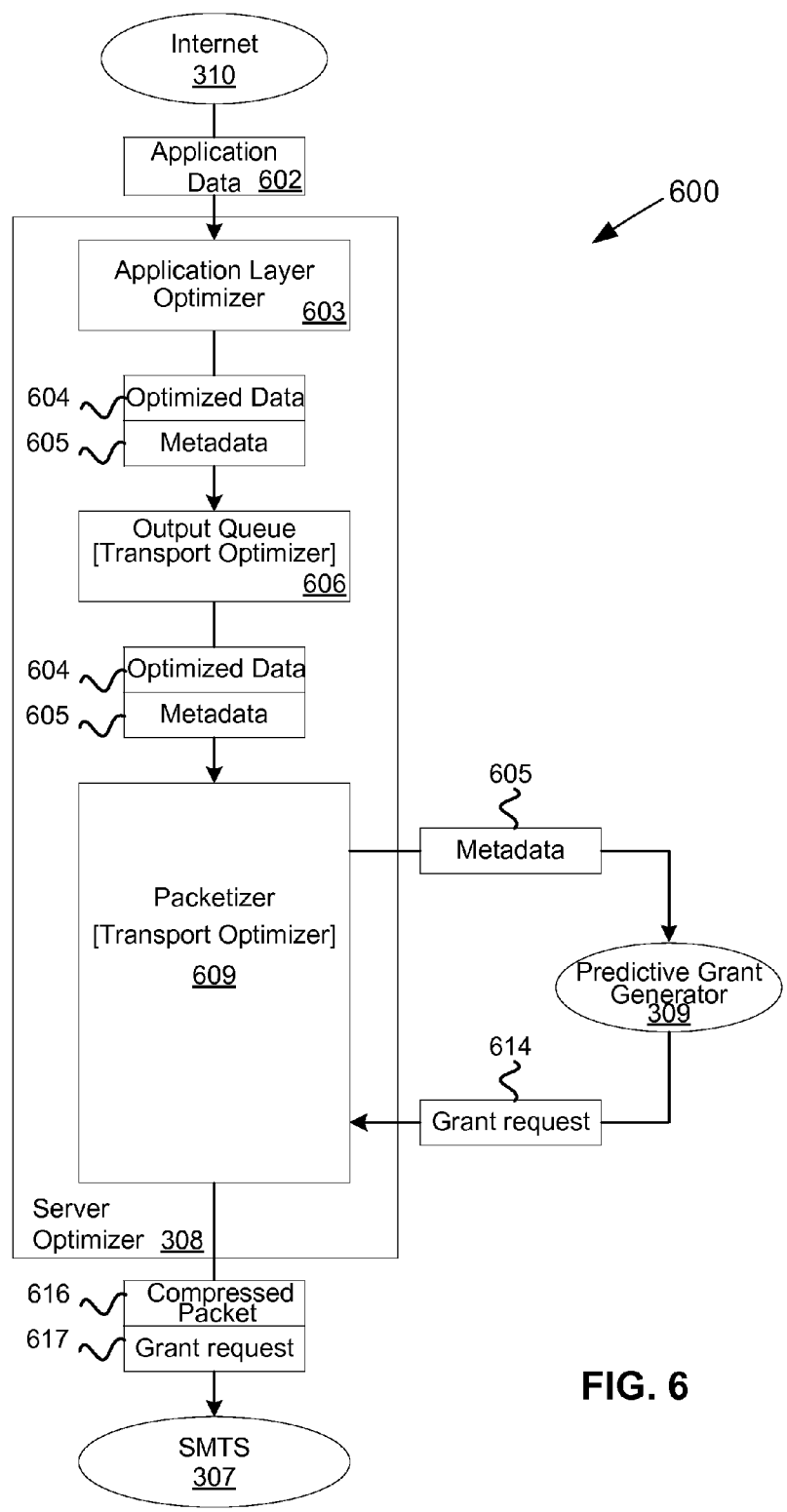
FIG. 6 shows an illustrative data flow within a server optimizer, like the one shown in FIG. 3, and according to various embodiments.

FIG. 6 shows an illustrative data flow 600 within a server optimizer 308, like the one shown in FIG. 3, and according to various embodiments. As discussed above, the server optimizer 308 processes application packets, extracts information useful to issuing grants, and supplies necessary interfaces to other modules to perform predictive grant allocation. For example, application data 602 is received from the Internet 310 by the server optimizer 308 at an application layer optimizer 603. The application layer optimizer 603 performs various optimization tasks, such as data compression and prefetching, resulting in optimized data 604. In addition, the application layer optimizer 603 extracts metadata 605 of interest to the predictive grant allocator. For example, the metadata 605 may include items such as those listed in Table 2.

In some embodiments, the items are attached to the blocks of optimized data 604 associated with the metadata 605 to form data pairs. The data pairs are then placed into an output queue 606 until a packetizer 609 is ready to send the data to the SMTS 307. Embodiments implement the output queue 606 and the packetizer 609 as part of a transport optimizer portion of the server optimizer 308.

While the metadata 605 and associated optimized data 604 may be maintained as a data pair through the output queue 606, the packetizer 609 may route each portion of the data pair in a different way. For example, the metadata 605 is sent to the predictive grant generator 309, which determines which grant requests 614 are expected to be needed as a result of the receipt of this packet, if any. As discussed above, the receipt of the packet from the Internet 310 may be considered an "event," in response to which future grant allocations may be predicted.

The determined grant requests 614 are sent back to the packetizer 609, where the optimized data 604 is maintained. The packetizer 609 may then attach information to the optimized data 604 indicating one or more associated grant requests 614 as attached grant requests 617. For example, the packetizer 609 adds header information to the optimized data 604 packet that indicates the grant requests 614. Accordingly, the output from the packetizer 609 may include a compressed packet 616 with attached grant requests 617 as an output data pair. The output data pair may be sent to the SMTS 307.

Figure 7:
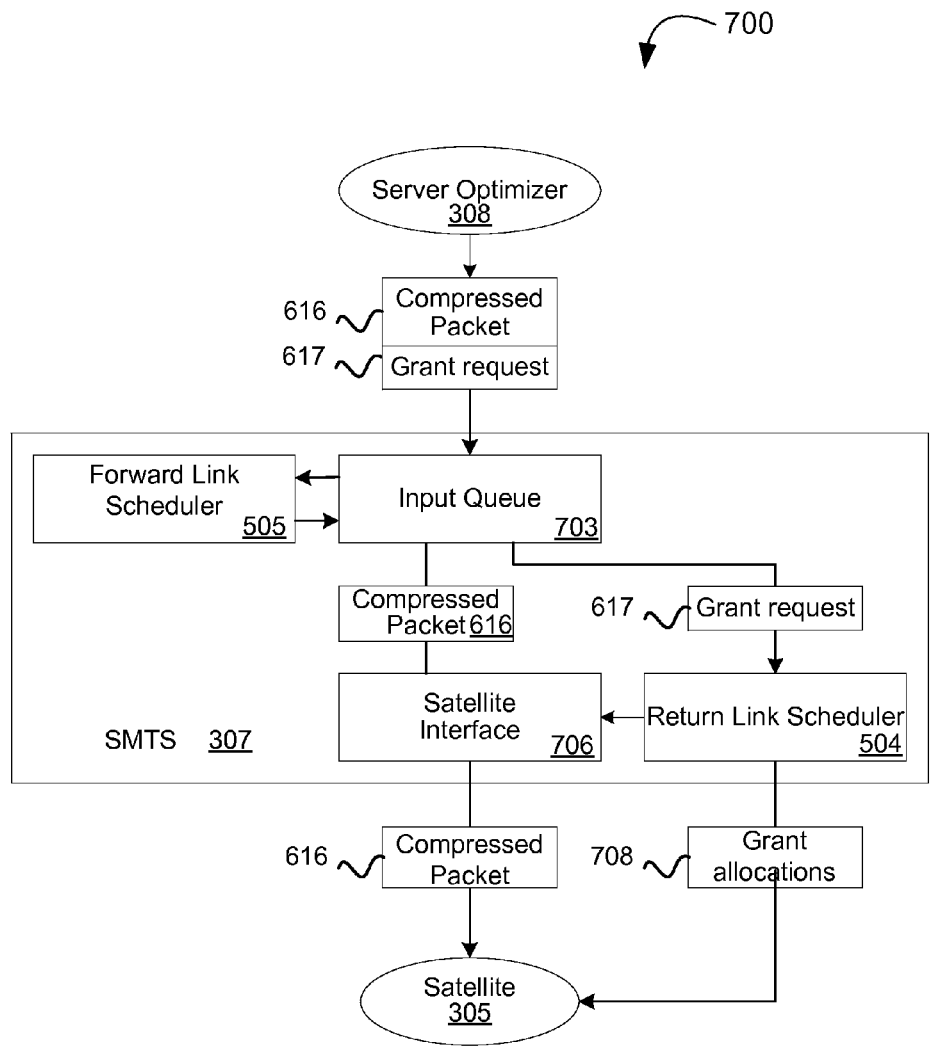
FIG. 7 shows an illustrative data flow within an SMTS, according to various embodiments.

FIG. 7 shows an illustrative data flow 700 within an SMTS 307, according to various embodiments. As discussed with reference to FIG. 6, the output of the server optimizer 308 may include output data pairs, each having a compressed packet 616 with one or more attached grant requests 617. The data pairs output from the server optimizer 308 are accepted by an input queue 703 of the SMTS 307. The input queue 703 notifies a forward link scheduler 505 when it receives data. The forward link scheduler 505 can then determine when the packet should be downloaded via the communications link (e.g., illustrated as satellite 305). When the time arrives for downloading the packet, the compressed packet 616 is sent to a satellite interface 706 of the SMTS 307.

Concurrently, the grant requests 617, each having timing offsets that may be associated with the delivery of the compressed packet 616, are forwarded to a return link scheduler 504. The return link scheduler 504 generates grant allocations 708 having appropriate time offsets and sizes according to the grant requests 617, and sends the grant allocations 708 to the satellite 305.

Notification of the subscriber terminal 130 of the grant allocations 708 may be implemented through typical mechanisms. In typical embodiments, the grant allocations 708 will each be associated with a time offset, such that the grant allocations 708 are associated with a time slot that is timed to be after the delivery of the packet by an amount of time specified in the grant request 617 (e.g., or determinable according to information in the grant request 617). While many different techniques (e.g., scheduler algorithms and queuing architectures) may be used, for each grant request 617, the technique informs the return link scheduler 504 of the time that the corresponding compressed packet 616 will be sent across the forward link. This allows the grants for the return link to be synchronized with these events regardless of any queuing or other delays on the forward link.

Figure 8:
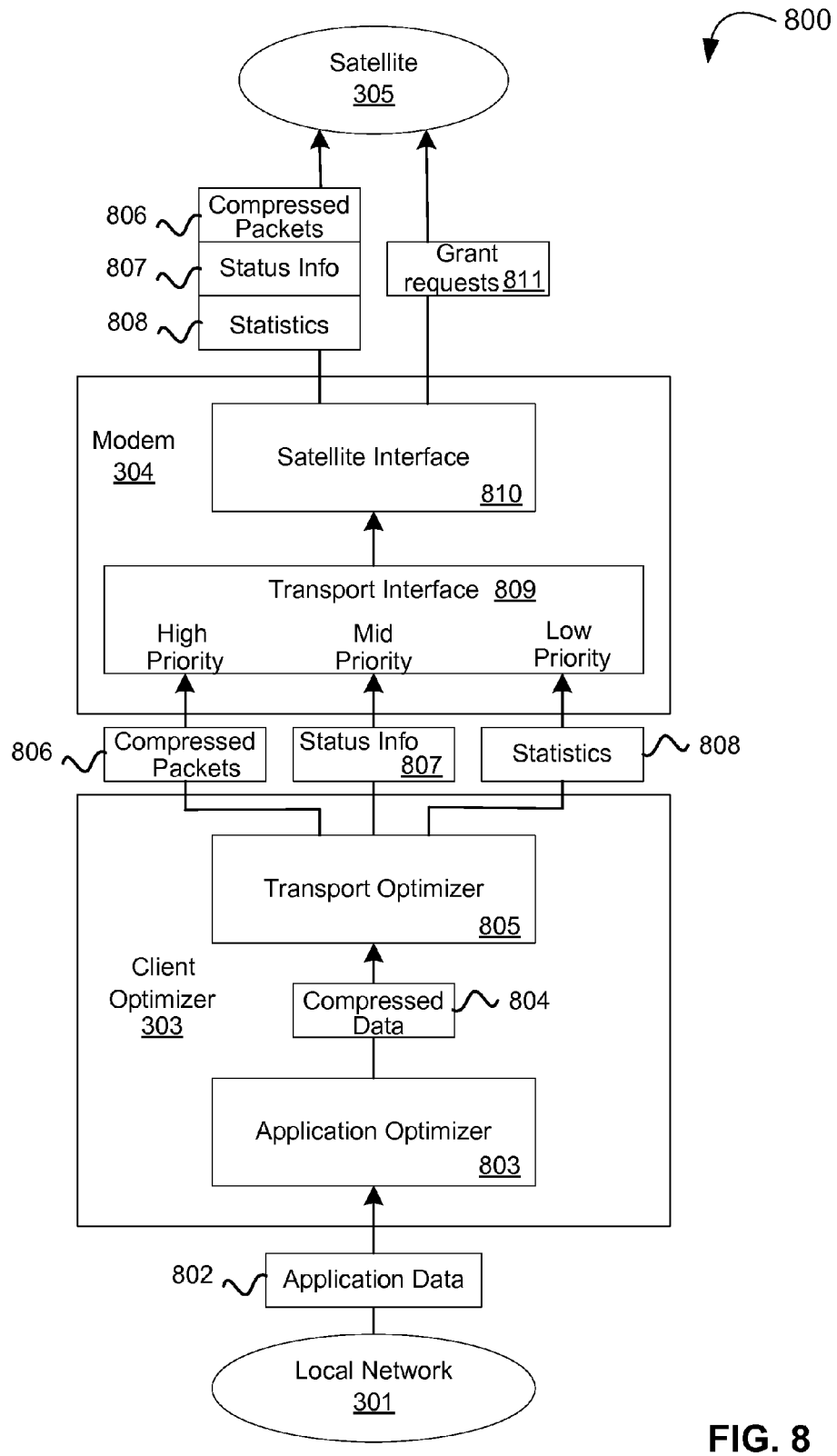
FIG. 8 shows an illustrative data flow within a subscriber terminal for uploading application data as well as return link management data, according to various embodiments.

FIG. 8 shows an illustrative data flow 800 within a subscriber terminal 130 for uploading application data as well as return link management data, according to various embodiments. Application data 802 is received from a local network 301 and may be compressed or otherwise transformed by an application optimizer 803. For example, the application optimizer 803 is implemented as part of the client optimizer 303. The data output by the application optimizer 803 (e.g., compressed data 804) is presented to a transport optimizer 805 for reliable and properly sequenced delivery of the compressed packets across the return link. The transport optimizer 805 may also be implemented as part of the client optimizer 303.

The transport optimizer 805 of the client optimizer 303 may send compressed packets 806 (e.g., which may or may not be the same as compressed data 804), transport status information 807 (e.g., how many bytes are waiting in the queue to be uploaded across the return link), and statistics 808 collected about the relationship between the arrival of downloaded packets across the forward link and subsequent receipt of blocks for uploading over the return link. In some embodiments, these three types of data are sent to a modem 304. In certain configurations, the types of data are prioritized using various techniques and as shown at the transport interface 809. The transport interface 809 communicates the data (e.g., according to priority) to a satellite interface 810, which uploads the data across the return link. The satellite interface 810 may also upload additional grant requests 811 when data blocks are received that were not anticipated by the predictive grant generator 309 (not shown).

Figure 9:
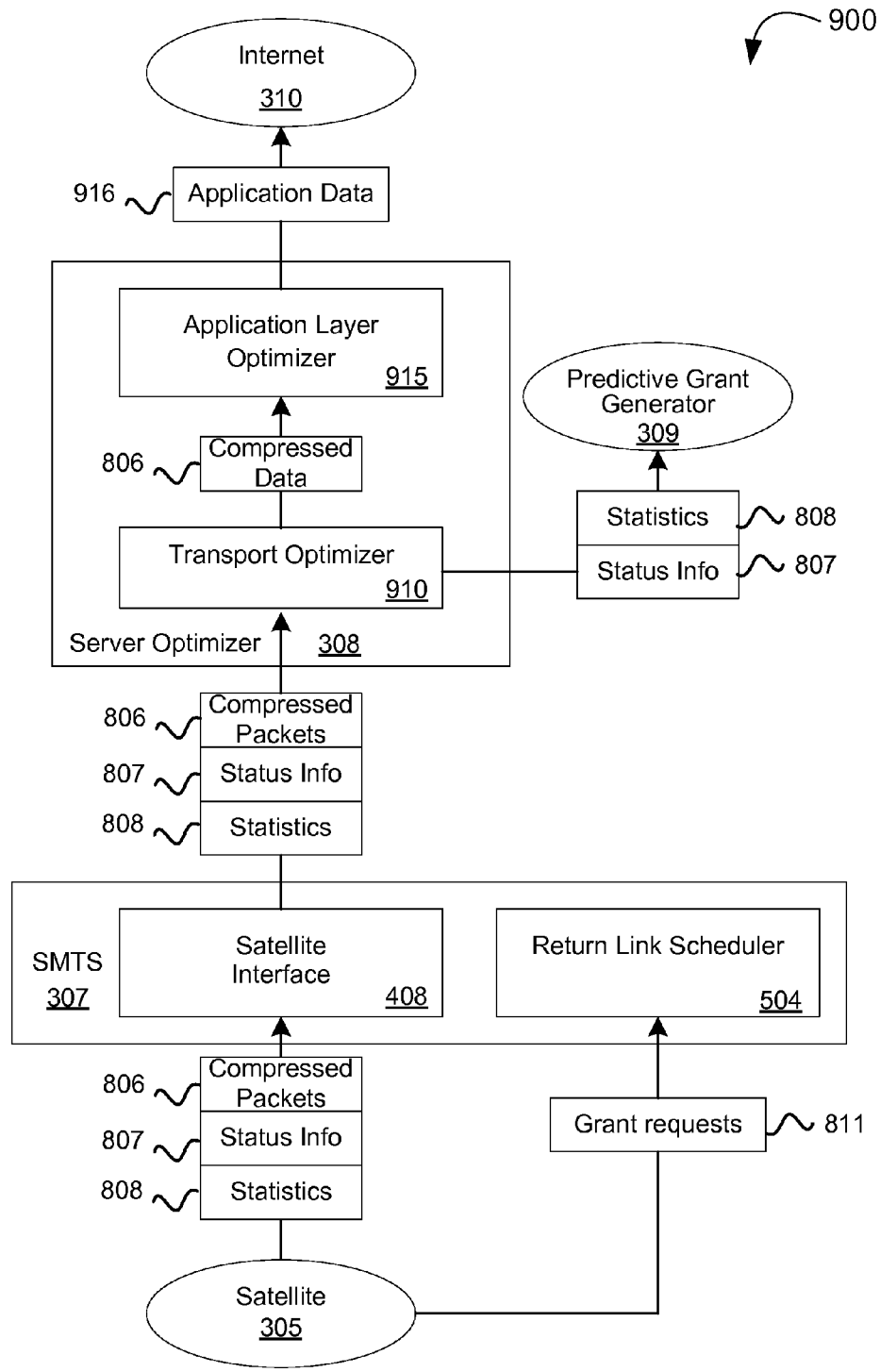
FIG. 9 shows an illustrative data flow involving processing of uploaded data as it arrives in the base station from the satellite, according to various embodiments.

FIG. 9 shows an illustrative data flow 900 involving processing of uploaded data as it arrives in the base station 306 from the satellite 305, according to various embodiments. As discussed with reference to FIG. 8, data being uploaded over the satellite 305 link may include compressed packets 806, status information 807, and statistics 808. There may also be additional grant requests 811 sent over the link. All the various types of data may be received at an SMTS 307. For example, the additional grant requests 811 are received and processed by a return link scheduler 504 in the SMTS 307 (e.g., as discussed above with reference to FIGS. 5 and 7). The compressed packets 806, status information 807, and statistics 808 may be received by a satellite interface 408 of the SMTS 307, and the satellite interface 408 may forward to data to the server optimizer 308.

The data received by the server optimizer 308 may be received at a transport optimizer 910, which may route the different types of data differently. For example, the status information 807 and statistics 808 are routed to the predictive grant generator 309 (e.g., as feedback to various predictive models). In this way, the predictive grant generator 309 effectively "tracks" the results of events and predictive grant allocations, and may adjust accordingly.

The compressed packets 806 may be sent to an application layer optimizer 915 for various types of application layer optimizations, including generating (e.g., parsing, decompressing, routing, etc.) useful types of application data 916. In certain embodiments, the application data 916 is generated to substantially preserve the application data 802 uploaded from the local network 301 (e.g., as described with reference to FIG. 8). The application data 916 may then be forwarded to the Internet 310.

Figure 10:
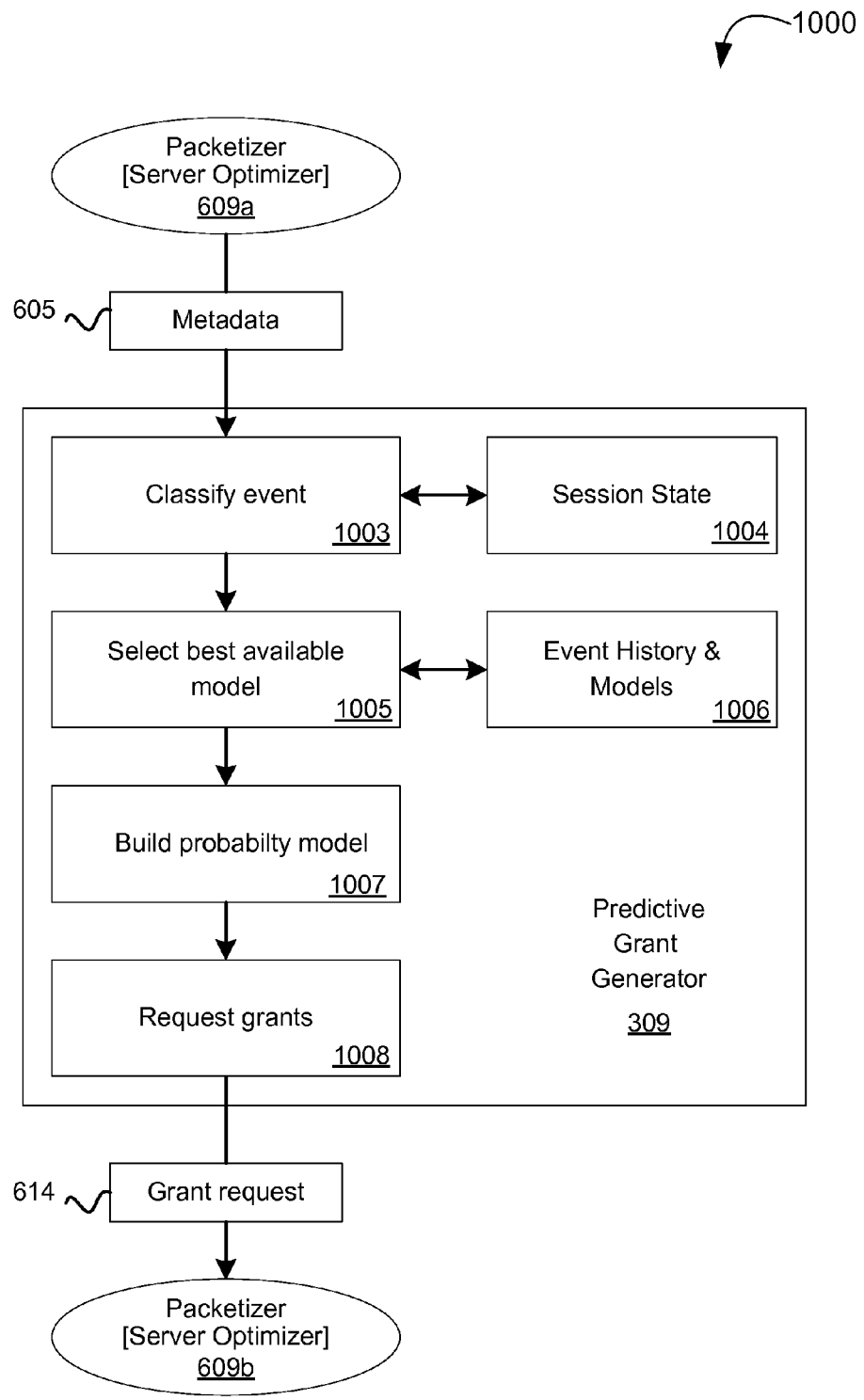
FIG. 10 illustrates the operation of an embodiment of a predictive grant generator, according to various embodiments.

FIG. 10 shows a data flow 1000 illustrating operation of an embodiment of a predictive grant generator 309, according to various embodiments. As described with reference to FIG. 6, the predictive grant generator 309 receives metadata 605 from a first portion of the packetizer 609a (e.g., of the server optimizer 308) and generates grant requests 614 for the second portion of the packetizer 609b that generates compressed packets 616 with attached grant requests 617. The received metadata 605 includes items, such as those presented in Table 2, and possibly also status information 807 and statistics 808 uploaded from the subscriber terminal 130.

The metadata 605 is received by an event classifier 1003 which uses it to update a model of the session state 1004. The session state 1004 model may include information, such as whether uploads of large files or web sites with many objects are in progress. Embodiments may additionally select an upload arrival model at 1006 using a model selector 1005. The upload arrival model 1006 predicts how many blocks will arrive at the user terminal for uploading, when each block will arrive, and the size of each block. Since the delivery time of each response packet is known from corresponding grant requests, the model allows the arrival time of the subsequent request packets to be predicted so that a return link grant can be issued that provides the necessary bytes with the shortest possible wait.

For example, a model is derived from the statistics 808 collected by the client optimizer 303. These statistics 808 are uploaded to the base station 306 where they are received and forwarded to the predictive grant generator 309, as illustrated by FIG. 9. The statistics 808 may report the arrival on the forward link of a packet N that is delivered to the local network 301 and the subsequent receipt of blocks of application data 802 to be uploaded on the return link. These statistics 808 are then associated with the parameters that were supplied to the classifier 1003 when N was originally scheduled to be sent. The results reported from the subscriber terminal 130 about N can then be used to update models 1006 for the classifiers 1003. For example, the results can be used to update a model 1006 of what uploads to expect for downloads associated with a particular content server or application.

When a new event arrives at the model selector 1005, different models 1006 may be available. A model 1006 may be session specific, in that its data is derived from recent events from this specific subscriber terminal 130, or it may be a shared model 1006, whose data is derived from events from other subscriber terminals 130 served at the base station 306. A model 1006 may be specific to a particular application, which might be identified by a TCP or UDP port or other information available to the optimizer. A model 1006 may also be the result of an analytic process, such as from analysis of references to embedded objects as discussed with reference to certain embodiments herein. The model 1006 can be specific to a particular server as identified by the IP address, to a web object such as identified by a URL, or to the file type as might be determined by the file extension in a URL or from the application information in the HTTP header.

The selection of the model 1006 is determined by the specificity of the model 1006 and the amount of sample data. An example of specificity is that a model 1006 for a URL previously requested by this session is more specific and hence more accurate than one from other sessions or for general HTTP objects. Having more samples of this event, such as a large number of previous requests for the same object, may allow for more accurate predictions than if there was only one previous request. The statistics from different models 1006 can be weighted according to these factors and then combined to produce a probability model 1007 (e.g., a composite upload arrival model).

The constraints on processing and storage capabilities may limit the complexity of the models 1006 that can be supported. For example, each response packet may be followed by more than one uploaded request, and the size and timing of these requests may be different in each sample associated with this model 1006. While many schemes are possible, one embodiment reduces the model 1006 to two variables. The first is the total number of bytes received in the interval that begins with the arrival of the downloaded packet on the forward link and ends with the first of either the arrival of another forward link packet or the end of a specified elapsed time (e.g., 600 milliseconds). The second variable is the offset within the interval at which all packets will be available for uploading onto the return link. For example, a probability estimator determines the number of bytes as the size of the data request, and the offset as a few milliseconds after the receipt of the last downloaded packet of the block via the forward link. The model 1006 stores the distribution of the sample values for each of the two variables so that the number of bytes and the time offsets are sufficient to handle most of the sampled events. The same or other factors may contribute to the complexity of the composite probability model 1007.

The probability model 1007 associated with the event is then sent to the grant requester 1008, which decides the size and timing of grants to request (e.g., in the form of grant requests 614). The selections depend on the availability of bandwidth on the return link. If the link is not heavily loaded, extra allocations can be provided in case the compressed packet to upload arrived after the first grant. If the link is loaded, a single allocation using more conservative timing is required.

The grant requests 614 thus specify the size of each request plus the time at which it should be granted, specified as an offset from the time at which the associated packet on the forward link is received by the subscriber terminal 130. To simplify the communication with the return link scheduler 504, the timing interval can be divided into a finite number of slots, which correspond to the period used by the return link scheduler 504 for issuing grants. For example, some schedulers use ten-millisecond grant intervals, so that there might be fifty slots before the next round trip time (RTT).

In addition to these "one-shot" allocations of a single grant for a specific time, the predictive grant generator 309 may also issue requests for continued bandwidth allocations, similar to an Enhanced Mobile Satellite Services (EMSS) scheduler. In this case, the request specifies a constant amount to allocate for each slot that would continue until a subsequent message modifies the request. This type of allocation may be done for large file uploads, or for certain application patterns where a continual allocation is more effective than a one-shot.

It is worth noting that, while embodiments discuss "grant requests" and allocations, these embodiments are intended more broadly to include other types of return-link resource allocation. In various embodiments, return-link resource allocations include grants and/or bandwidth adjustments. For example, a "grant request," "allocation," or similar phrase is intended to include a size and timing of an actual grant allocation or an adjustment of return-link bandwidth to occur according to a particular timing offset.

As discussed above with reference to FIG. 6, the grant requests 614 may be attached, as attached grant requests 617, to the compressed packets 616 to be sent on the forward link for which the return grant is associated. As discussed with reference to FIG. 7, the packets are then placed in the SMTS input queue 703, where they may wait until the forward link scheduler 505 is ready to send them. The grant request 617 is then sent to the return link scheduler 504. If the grant request 617 for the return link was for the first available slot, that slot would be available on the subscriber terminal 130 just after the compressed packet 616 on the forward link arrived.

Figure 11:
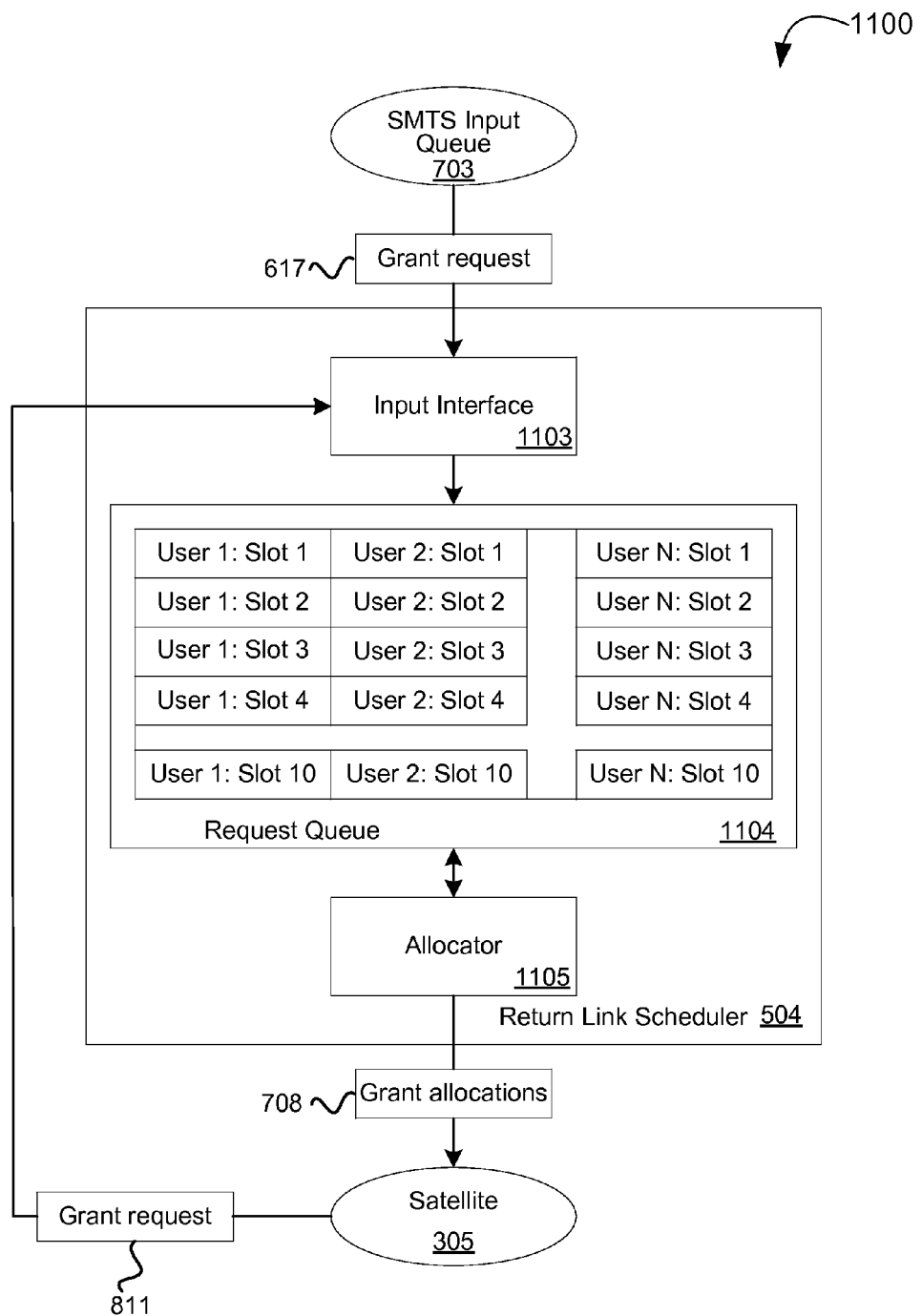
FIG. 11 shows an illustrative technique for processing grant requests into grant allocations using a return link scheduler, according to various embodiments.

FIG. 11 shows a data flow 1100 of an illustrative technique for processing grant requests 617 into grant allocations 708 using a return link scheduler 504, according to various embodiments. As discussed above, the return link scheduler 504 receives predictive grant requests 617 from the predictive grant generator 309 and additional grant requests 811 from the subscriber terminal 130 via the satellite link 305. According to the illustrated embodiment, the input interface 1103 places these requests into a request queue 1104 that contains one entry for each slot for each subscriber terminal 130 sharing the link.

In one embodiment, slots are selected using modulo arithmetic: if a predictive grant request is to be issued at time X after the download of the associated packet, it is placed in the slot that is X ahead of the current slot using modulo addition. Grants from the subscriber terminal 130 are immediate, so they are can be placed in the next slot to be serviced. Various embodiments may combine the requests from the two sources (i.e., the predictive grant generator 309 and the subscriber terminal 130) using a maximum algorithm: the scheduler uses the larger of the two requests for any time slot.

Depending on a required support for QoS, more than one entry may be needed per slot to distinguish between different data priorities associated with the application for which the grant was requested. A total count of all bytes at each priority level for all users may be kept for each slot. When the requests are added to the request queue 1104, the appropriate total may be increased accordingly.

At the beginning of each time slot, the allocator 1105 may use these slot totals to establish the prioritization strategy for this time interval. In one illustrative embodiment, the allocator 1105 determines that it can fulfill all high priority requests, but may have to defer 50% of lower priority requests. Accordingly, it cycles through the row of user entries for that time slot and issues grants according to this strategy. Any unfilled grants can be rolled into the next slot for that subscriber terminal 130. The allocator 1105 reports on the current load status to the predictive grant generator, so that it can adjust its request strategy to work most effectively with the current available bandwidth. Other types of allocation are possible according to other embodiments.

Many of the embodiments described above track various data to maintain and update models for efficient predictive grant scheduling. For example, when a certain type of packet is detected on the forward link, a model is consulted to see if the detected packet is close or identical to something for which a model is known. However, when a new type of packet is seen for the first time, it may be difficult or impossible to find a fitting model without performing additional processing.

Some embodiments include scanning functionality for extracting useful data from data traversing the link where tracking techniques are insufficient, inefficient, etc. For example, packets may be parsed to find embedded objects and/or other data for use in detecting predictive events. These additional metadata sources can be fed, in similar ways to those discussed above, to a predictive grant generator for efficient return-link allocation.

Figure 12:
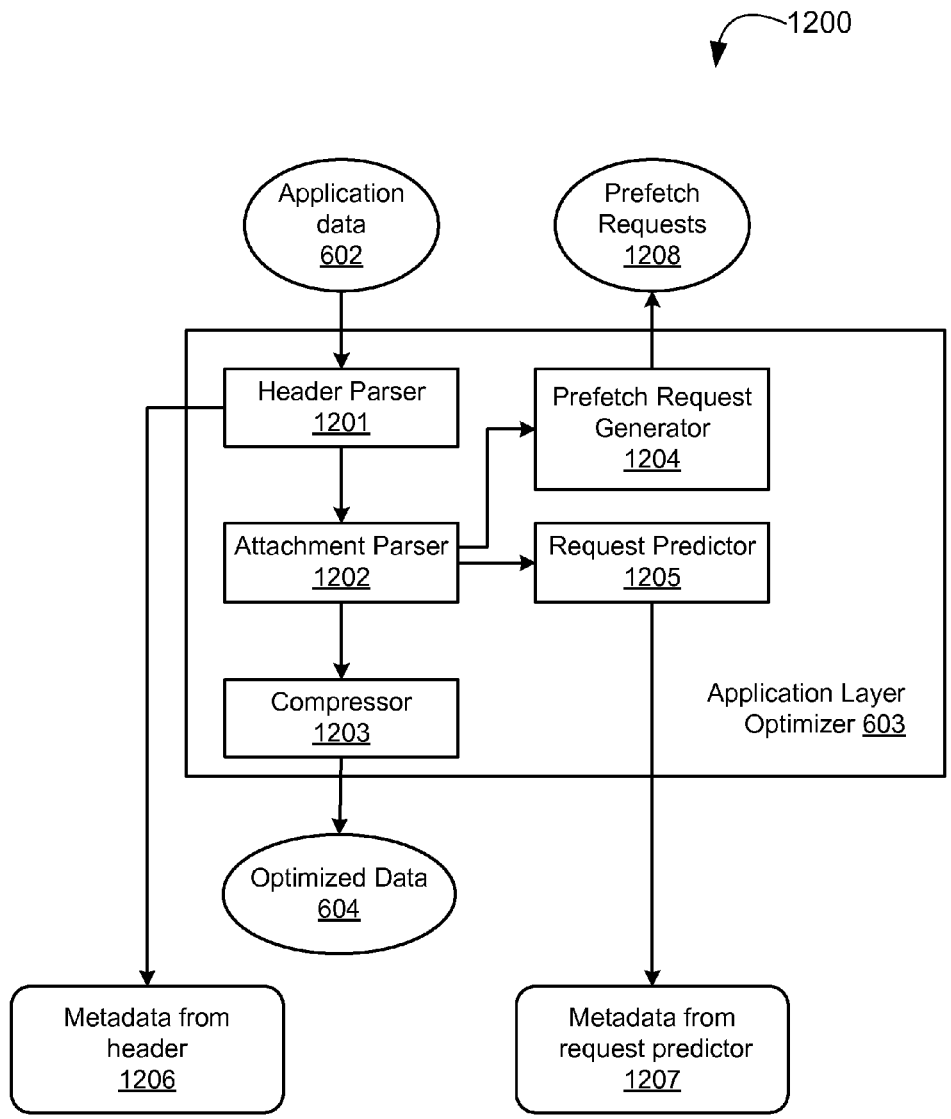
FIG. 12 shows an illustrative functional block diagram of an embodiment of an application layer optimizer configured to implement scanner functionality to assist in predictive grant allocation, according to various embodiments.

Turning to FIG. 12, an illustrative functional block diagram 1200 shows an embodiment of an application layer optimizer 603 configured to implement scanner functionality to assist in predictive grant allocation, according to various embodiments. The application layer optimizer 603 may be implemented as part of a server optimizer 308. For example, the application layer optimizer 603 may represent an embodiment of the application layer optimizer 603 discussed with reference to FIG. 6. As in FIG. 6, the application layer optimizer 603 received application data 602 (e.g., from the Internet 310) and outputs optimized data 604 and metadata 1206/1207 (e.g., corresponding to metadata 605 of FIG. 6).

According to the illustrated embodiment, the application data 602 is received at a header parser 1201. For example, the header parser 1201 parses header information from the application data 602 packets (e.g., HTTP header information) to determine file type, file size, host name, user agent, etc. This information can be output as header metadata 1206.

In some embodiments, the application layer optimizer 603 further parses the application data 602 for additional metadata. For example, the application data 602 may include in-line objects, embedded objects, object requests, and/or other types of files or data that may relate to the type of data that will likely be generated at the client side (e.g., the subscriber terminal) for upload in response to receiving the application data 602. A request predictor 1205 uses this additional data to generate additional types of metadata useful for request prediction. This information can be output as request predictor metadata 1207, which may include numbers, sizes, and timing of objects likely to be requested in the near future.

Certain embodiments of the application layer optimizer 603 implement prefetching functionality. A prefetch request generator 1204 may generate prefetch requests 1208 according to information parsed by the attachment parser 1202. For example, the attachment parser 1202 detects a series of requests in a downloaded HTML page for embedded objects likely to be requested by the end user's web browser after receipt of the HTML page. The prefetch request generator 1204 generates a series of prefetch requests 1208 for these embedded objects to accelerate the user's experience.

Notably, it may be desirable to coordinate functionality of the request predictor 1205 and the prefetch request generator 1204. For example, a prefetcher may indicate that future requests for objects are likely according to the currently downloaded file (e.g., it may be likely that embedded objects in an HTML file will be requested after the HTML file is received), and this information may be useful to predictive allocation of return-link bandwidth. While scanner (e.g., prefetcher) functionality may help identify objects likely to be requested in the near future, the timing offsets of those future requests may still be unknown. According to various embodiments, general modeling techniques and/or certain techniques described above may be used to help determine appropriate timing offsets.

In some embodiments, the application data 602 is sent to a compressor 1203, which outputs the optimized data 604 (e.g., as a compressed packet), as discussed above. For example, as illustrated in FIG. 6, the metadata 605 generated by the application layer optimizer 603 (e.g., using tracker and/or scanner functionality) is used by the predictive grant generator 309 to generate grant requests 614. A packetizer 609 than generates packets having compressed packets 616 (e.g., corresponding to the application data 602) and attached grant requests 617, which are sent to the SMTS 307 for transmission over the satellite link.

Figure 13:
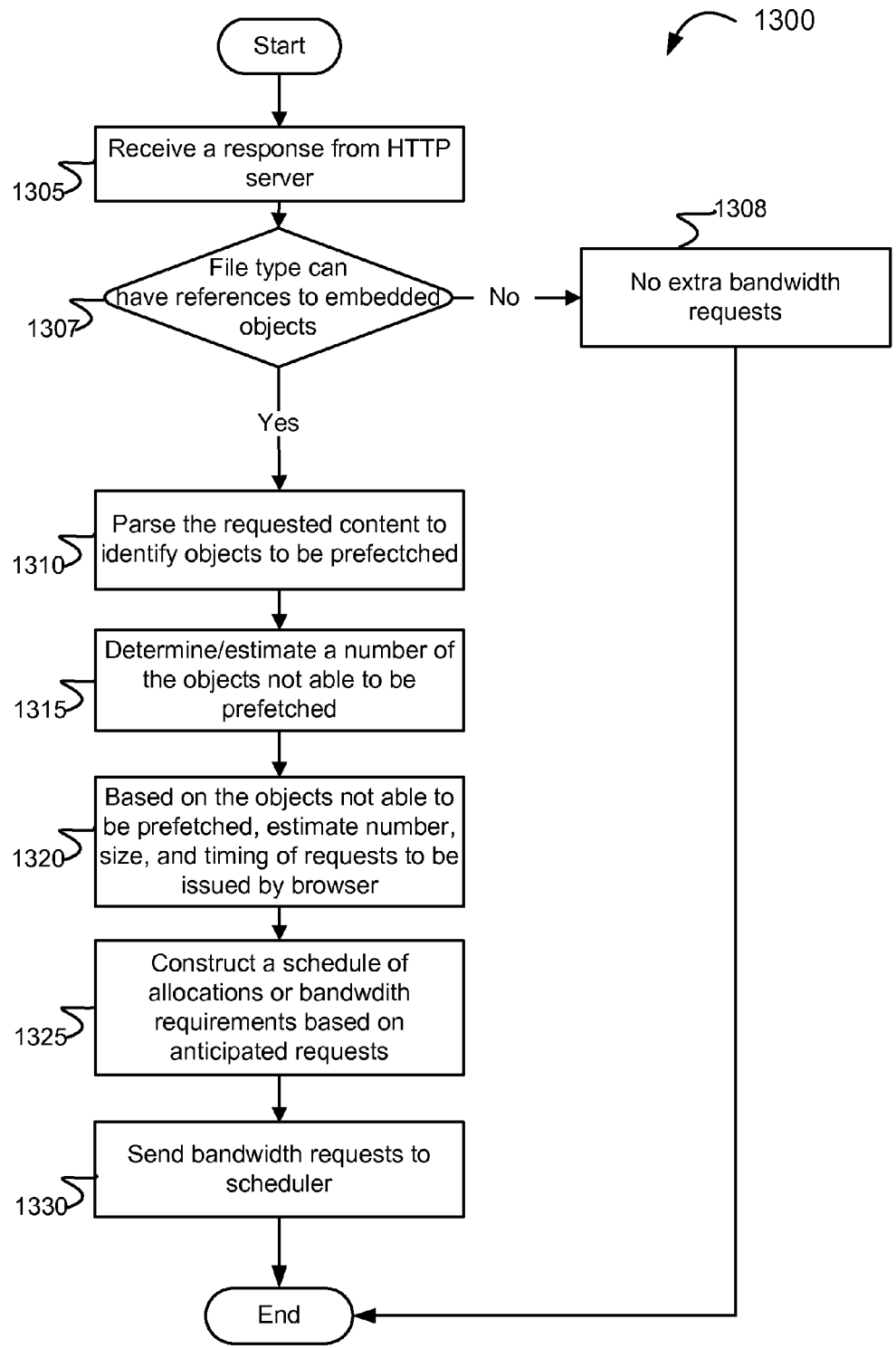
FIG. 13 shows a flow diagram of an illustrative method for using scanning in the context of predictive grant generation, according to various embodiments.

FIG. 13 shows a flow diagram of an illustrative method 1300 for using scanning in the context of predictive grant generation, according to various embodiments. As discussed above, some embodiments of techniques for scanning (i.e., interception and parsing of application data packets) may be similar to techniques for using tracking to predict requests for prefetching. At block 1305, a request predictor intercepts the response from the web server. At decision block 1307 a determination is made as to whether the object is likely to contain references to embedded objects that will be subsequently be requested by the browser. For example, an object type (image, HTML, Java script, video, etc.) is determined from the response using information in the HTTP header, and the file type is used to determine whether subsequent requests for embedded objects are likely. For the sake of illustration, a video or image file may be unlikely to contain such references, while file types like HTML, XML, CSS, and Java scripts often have such references. If the object is not likely to reference embedded objects, it is determined at block 1308 that no extra bandwidth is needed on the return link.

If the object is likely to contain references to embedded objects, the HTML page (or other content page) may be parsed by, for example, a prefetcher, to identify the embedded objects that may be prefetched at block 1310. Prefetching may be preformed as described in U.S. patent application Ser. No. 12/172,913, entitled "METHODS AND SYSTEMS FOR PERFORMING A PREFETCH ABORT OPERATION," filed on Jul. 14, 2008, which is incorporated by reference in its entirety for any and all purposes. During prefetching it may be determined that some objects cannot be prefetched. For example, for various reasons when a URL is constructed either from a Java script or some other source, the URL is invalid, and fails to yield a viable object for prefetching. Alternatively, simply by the very nature of prefetching (e.g., which may be a pseudo-random process), some embedded objects are missed, and thus are not prefetched. Hence, for each response packet that is parsed or scanned, a determination/estimation is made as to the number of objects which could not or were not prefetched at block 1315.

At block 1320, an estimate is prepared as to the number, size, and timing of requests that are expected to be uploaded after the receipt of the HTML or other object. The size of the requests may depend on factors such as the HTTP cookies associated with the site or the type of data compression that may be applied to the request. The timing and number of requests may depend on the browser application type and configuration. The browser type and configuration might be determined from the original HTTP request header or by keeping a record of previous request patterns for this user session. These patterns are also affected by the customer-premises network and other software and equipment. The parsing of the web page may discover other factors that may affect the subsequent issuance of requests, such as the presence of Java scripts that require the resolution of other external objects before subsequent objects can be requested.

At block 1325, these estimates are used to construct a schedule of allocations or bandwidth requirements. As discussed above, satellite links may use different types of schedulers. For example, if a Demand Assigned Multiple Access (DAMA) scheduler is used, the allocations may be specified as a specific series of block allocations to occur at specific times, whereas if an EMSS scheduler is used, the allocation might be specified as an increase in return link bandwidth provisioned for the user terminal for an interval beginning when the HTML response is delivered to the user terminal. Either or both supplemental approaches can be used and integrated with the type of default scheduler currently in use. The complexity of analysis performed at process block 1320 affects the complexity of the schedule. A simple analysis may result in a simple increase in bandwidth or extra block allocation. A more complex analysis might produce a sequence of precisely timed block allocations or changes in allocated bandwidth.

At process block 1330, the list of supplemental allocations is sent to the scheduler. For example, as described above, predictive grant requests 617 may be sent to the return link scheduler 504 for generation of grant allocations 708. The scheduler may use this list to supplement or adjust a default scheduling algorithm. The grant allocations (e.g., actual grants or bandwidth adjustments) will begin shortly after the HTML response reaches the subscriber terminal 130. This may allow time for the customer premises equipment to receive and parse the HTML page and then to issue the requests for the embedded objects. The amount of delay may depend, for example, on the analysis that was done at process block 1320.

Accordingly, at process block 1330, a scheduler (or similar device) may be instructed to allocate (or provide grant space for) the client's usage based on the determined bandwidth needed to download the non-prefetched objects. Accordingly, the bandwidth grants from the schedule may be "pre-granted" such that at the time in which the grant space is needed, the grant is available, thus reducing delay to the client system.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices, and/or other machine-readable mediums for storing information. The term "machine-readable medium" includes, but is not limited to, portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

What is claimed is:

1. A method for event-driven predictive scheduling of a return link in a communication system comprising:

detecting, at a provider side of the communications system, an event predictor corresponding to a download packet associated with an HTTP object destined for a user terminal over a forward link of the communications system, the event predictor indicating a future event to occur in association with receipt of the download packet at the user terminal;

selecting a prediction model according to the detected event predictor from a plurality of prediction models maintained at the provider side of the communications system, wherein each prediction model of the plurality of prediction models estimates a size or timing of a future communications event associated with the HTTP object;

generating a resource allocation according to the selected prediction model at the provider side of the communications system, the resource allocation indicating a magnitude by which to adjust resources of the return link of the communications system associated with the user terminal, and the resource allocation indicating a timing offset at which to adjust the resources by the magnitude, the timing offset corresponding to an amount of time after occurrence of the event;

scheduling the resources of the return link of the communications system associated with the user terminal at least according to the resource allocation; and communicating data corresponding to the data packet and data corresponding to the resource allocation to the user terminal over the forward link of the communications system;

wherein selecting the prediction model according to the detected event predictor comprises:

scanning the download packet to extract metadata, the metadata indicating at least one HTTP object likely to be requested subsequent to receiving the download packet at the user terminal; and selecting the prediction model at least according to the metadata.

2. The method of claim 1, further comprising:

receiving feedback data at the provider side of the communications system over the return link from the user terminal, the feedback data relating to a magnitude and a timing of at least one request issued by the user terminal subsequent to and associated with the event; and updating at least one of the plurality of prediction models according to the feedback data.

3. The method of claim 1, wherein generating the resource allocation according to the selected prediction model comprises:

generating a grant request, the magnitude being a size of the grant request to allocate on the return link of the communications network.

4. The method of claim 1, wherein generating the resource allocation according to the selected prediction model comprises:

determining a bandwidth adjustment, the magnitude indicated by the allocation request being a magnitude by which to adjust bandwidth on the return link of the communications network for the user terminal.

5. The method of claim 1, wherein:

generating the resource allocation comprises generating an allocation request and communicating the allocation request indicating the magnitude and the timing offset associated with the resource allocation to a return-link scheduler; and scheduling the resources of the return link of the communications system associated with the user terminal at least according to the resource allocation comprises using the return-link scheduler to adjust allocation of the resources of the return link by the magnitude at a time corresponding to the timing offset.

6. The method of claim 1, further comprising:

receiving at least one allocation request at the provider side of the communications system over the return link from the user terminal; and scheduling the resources of the return link of the communications system associated with the user terminal further according to the at least one allocation request.

7. The method of claim 1, wherein scanning the download packet to extract the metadata comprises:

scanning the download packet to extract header metadata from a header portion of the download packet; and scanning the download packet to generate request predictor metadata corresponding to a payload portion of the download packet indicating at least one associated attachment.

8. The method of claim 1, wherein communicating data corresponding to the data packet and data corresponding to the resource allocation to the user terminal over the forward link of the communications system comprises:

generating a combined packet comprising data corresponding to the download packet and data corresponding to the allocation request; and communicating the combined packet to the user terminal over the forward link of the communications system.

9. The method of claim 1, wherein the forward link and the return link are portions of a satellite link between a base station at the provider side of the communications system and the user terminal.

10. The method of claim 1 wherein detecting, at the provider side of the communications system, the event predictor corresponding to the download packet comprises:

parsing the download packet to identify objects; and estimating at least one object of the objects not able to be prefetched;

wherein the download packet comprises HTTP header information.

11. The method of claim 10 wherein the prediction model estimates a number, a size, and a timing of requests to be received at the provider side of a communications system in response to the estimating at least one object of the objects not able to be prefetched.

12. The method of claim 11 wherein selection of the prediction model is determined by a specificity of the prediction model and an amount of sample data;

wherein the amount of sample data comprises a number of previous requests for the HTTP object recorded in the prediction model; and wherein the specificity of the prediction model is based on at least one request recorded in the prediction model from a same session as a session of the download packet.

13. The method of claim 12 wherein the plurality of prediction models comprises at least one model specific to a server as identified by an internet protocol (IP) address of the server and at least one model specific to the HTTP object.

14. A base station system disposed in a satellite communications network and in communication with a user terminal over a satellite link having a forward link and a return link, the system comprising:

an optimizer subsystem, configured to detect an event predictor corresponding to a download packet associated with an HTTP object destined for the user terminal over the forward link, the event predictor indicating a future event to occur in association with receipt of the download packet at the user terminal;

a predictive grant generator subsystem, communicatively coupled with the optimizer subsystem, and configured to select a prediction model according to the detected event predictor, and generate a resource allocation according to the selected prediction model, wherein the prediction model estimates a size or timing of a future communications event, the resource allocation indicating a magnitude by which to adjust resources of the return link and a timing offset at which to adjust the resources by the magnitude, the timing offset corresponding to an amount of time after occurrence of the event; and a satellite modem termination subsystem, communicatively coupled with the predictive grant generator subsystem and the optimizer subsystem, and configured to:
schedule the resources of the return link at least according to the resource allocation; and
communicate data corresponding to the download packet and data corresponding to the resource allocation to the user terminal over the forward link;

wherein:
the optimizer subsystem is configured to detect the event predictor corresponding to the download packet by scanning the download packet to extract metadata, the metadata indicating at least one HTTP object likely to be requested subsequent to receiving the download packet at the user terminal; and
the predictive grant generator subsystem is configured to select the prediction model at least according to the metadata.

15. The system of claim 14, wherein:
the satellite modem termination subsystem is further configured to receive feedback data relating to a magnitude and a timing of at least one request issued by the user terminal subsequent to and associated with the event and to communicate the feedback data to the predictive grant generator subsystem; and
the predictive grant generator subsystem is further configured to update at least one of the plurality of prediction models according to the feedback data.

16. The system of claim 14, wherein the satellite modem termination subsystem is configured to schedule the resources of the return link at least according to the resource allocation by generating at least one grant request sized according to the magnitude of the resource allocation and timed according to the timing offset of the resource allocation.

17. The method of claim 14, further comprising: a packetizer, communicatively coupled with the predictive grant generator subsystem, and configured to generate a combined packet comprising optimized data corresponding to the download packet and data corresponding to the allocation request; and the satellite modem termination subsystem is configured to communicate the data corresponding to the data packet and the data corresponding to the resource allocation by communicating the combined packet to the user terminal over the forward link.

18. A satellite communications system comprising:
a base station in communication with a user terminal over a satellite link having a forward link and a return link, and configured to:
detect an event predictor corresponding to a download packet associated with an HTTP object destined for the user terminal over the forward link, the event predictor indicating a future event to occur in association with receipt of the download packet at the user terminal;
select a prediction model according to the detected event predictor, wherein the prediction model estimates a size or timing of a future communications event;
generate a resource allocation according to the selected prediction model, the resource allocation indicating a magnitude by which to adjust resources of the return link and a timing offset at which to adjust the resources by the magnitude, the timing offset corresponding to an amount of time after occurrence of the event;
schedule the resources of the return link at least according to the resource allocation; and
communicate data corresponding to the download packet and data corresponding to the resource allocation to the user terminal over the forward link;
wherein the base station is further configured to select the prediction model by:
scanning the download packet to extract metadata indicating at least one HTTP object likely to be requested subsequent to receiving the download packet at the user terminal; and
selecting the prediction model at least according to the metadata.

19. The system of claim 18, the base station further configured to:
receive feedback data over the return link from the user terminal, the feedback data relating to a magnitude and a timing of at least one request issued by the user terminal subsequent to and associated with the event; and
update at least one of the plurality of prediction models according to the feedback data.

20. The system of claim 18, further comprising:
the user terminal, communicatively coupled with the base station over the satellite link, and configured to:
receive the data corresponding to the download packet and the data corresponding to the resource allocation from the base station over the forward link;
receive an upload packet from an application in communication with the user terminal at least partially in response to receiving the data corresponding to the download packet; and
upload the upload packet to the base station via the return link according to the resource allocation.

* * * * *